(12) United States Patent
Tao

(10) Patent No.: US 9,762,195 B1
(45) Date of Patent: Sep. 12, 2017

(54) SYSTEM FOR EMITTING DIRECTED AUDIO SIGNALS

(71) Applicant: AMAZON TECHNOLOGIES, INC., Seattle, WA (US)

(72) Inventor: David Zhi-Jun Tao, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 14/577,633

(22) Filed: Dec. 19, 2014

(51) Int. Cl.
*H03G 3/20* (2006.01)
*G01S 15/06* (2006.01)

(52) U.S. Cl.
CPC .............. *H03G 3/20* (2013.01); *G01S 15/06* (2013.01)

(58) Field of Classification Search
CPC  H04R 5/02; H04R 2205/022; H04R 2217/03; H04R 2499/15; H04R 1/20; H04R 1/32; H04R 1/323; H04R 1/34; H04R 1/345; H04R 1/403; H03G 3/20; G01S 15/06; G06F 3/165
See application file for complete search history.

(56) References Cited

U.S. PATENT DOCUMENTS

| 6,229,899 | B1 * | 5/2001 | Norris | G10K 15/02 381/77 |
| 2004/0151325 | A1 * | 8/2004 | Hooley | F41H 13/0081 381/18 |
| 2008/0055548 | A1 * | 3/2008 | Matsuzawa | B06B 1/0603 353/15 |
| 2009/0060237 | A1 * | 3/2009 | Konagai | H04R 1/403 381/307 |
| 2011/0243353 | A1 * | 10/2011 | Takumai | H04R 1/403 381/300 |
| 2012/0076306 | A1 * | 3/2012 | Aarts | H04R 3/14 381/17 |
| 2013/0216069 | A1 * | 8/2013 | Onishi | H04R 17/00 381/190 |
| 2013/0230180 | A1 * | 9/2013 | Thormundsson | G01S 15/526 381/56 |
| 2013/0279706 | A1 * | 10/2013 | Marti | G06F 3/165 381/57 |
| 2014/0254811 | A1 * | 9/2014 | Takeda | H04S 7/303 381/58 |
| 2015/0264509 | A1 * | 9/2015 | Oishi | G06F 3/165 381/303 |

* cited by examiner

*Primary Examiner* — Mark Fischer
(74) *Attorney, Agent, or Firm* — Lindauer Law, PLLC

(57) ABSTRACT

Described are techniques for providing users of an audio device with a surround sound experience using ultrasonic transducers of the audio device. The audio device may emit ultrasonic pulses to determine distances between the audio device and one or more objects by detecting ultrasonic pulses reflected by the objects. The intensity and timing of subsequent signals may be determined based on the distances. In addition to providing audio or video content from speakers or a display of the audio device, the ultrasonic transducers may emit ultrasonic carriers modulated with audio signals toward the objects. The ultrasonic carriers demodulate upon interaction with the objects to produce audible sound, which may be reflected back toward the audio device such that the sound appears to be emanating from the object. By timing the emission of the ultrasonic carriers and content from the device speakers and display, the surround sound experience may be synchronized.

20 Claims, 8 Drawing Sheets

SYSTEM FOR EMITTING DIRECTED AUDIO SIGNALS

BACKGROUND

Audio output is useful in a variety of situations, such as in reproducing human speech, providing audible prompts, and so forth. Audio devices provide audible sound to users with speakers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
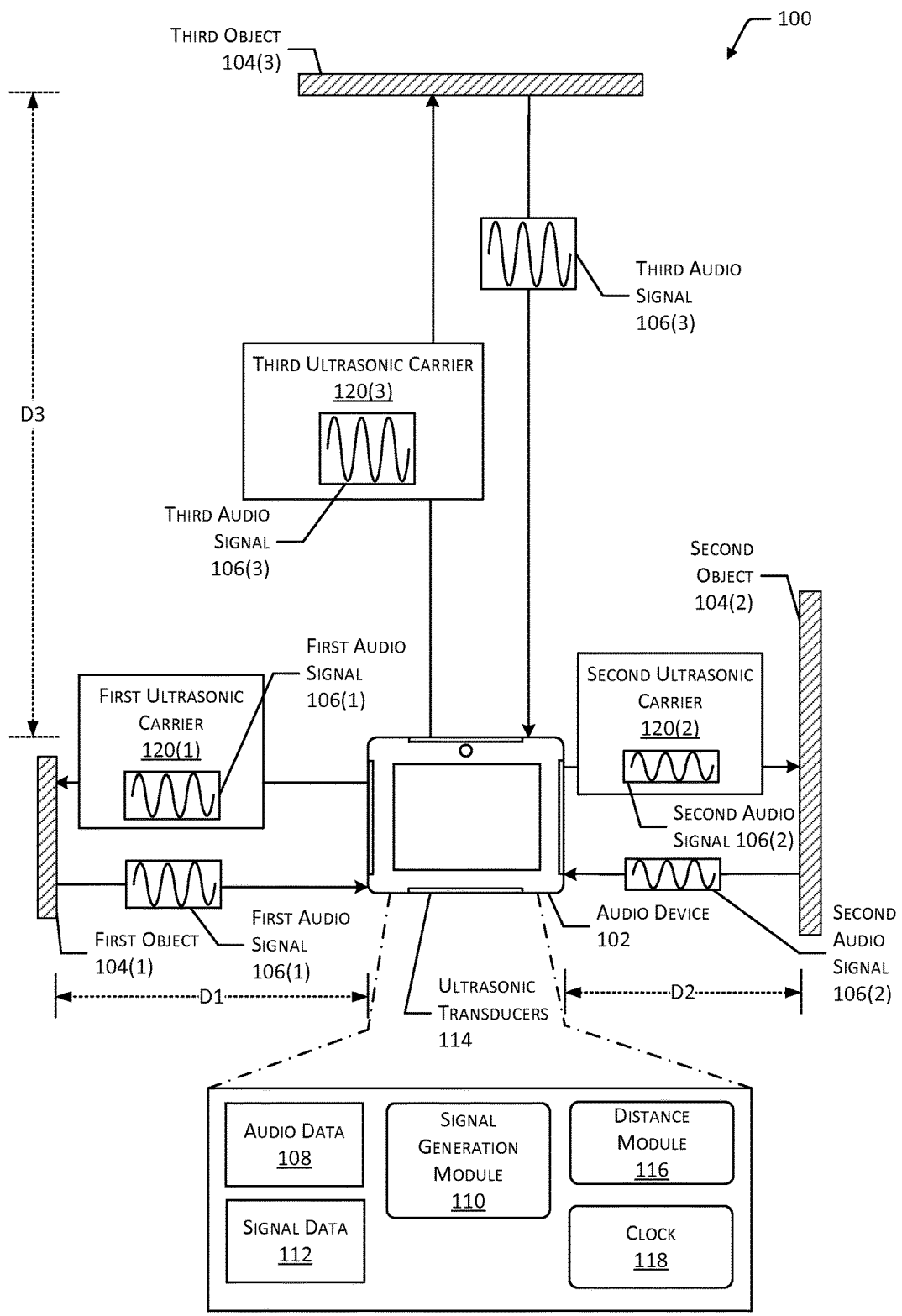
FIG. 1 depicts a system for determining a position of an audio device relative to one or more objects and emitting audio signals based on the distance between the audio device and the objects.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Audio devices convert electrical signals into sound through use of transducers, such as speakers, which generate sound waves. A user experience as to the spatial location of a sound source is typically limited to the location where the sound is emanating from, such as a speaker of an audio device. The audible experience of a user hearing sounds emanating from different spatial locations may be referred to as "surround sound," in that users experience the sounds from around them. Conventional systems for providing a surround sound experience may utilize multiple physical speakers external to the audio device, positioned in various directions relative to the user. For example, while experiencing surround sound, a user may hear, from one or more speakers, the sound of a vehicle appear to move from left to right, front to back, and so forth. Each speaker, or set of speakers, may be associated with a different surround channel. A surround channel may be defined by the particular audible sounds and the characteristics of those audible sounds produced using the speakers associated with that surround channel. To produce the surround sound experience, each surround channel may be used to provide audible sound having different characteristics. For example, the volume of a sound provided from a first direction, corresponding to a first surround channel, may differ from the volume of a sound provided from a second direction, corresponding to a second surround channel.

This disclosure describes techniques for providing one or more surround channels in a surround sound experience to a user with ultrasonic transducers associated with an audio device, such as speakers mounted or otherwise affixed to the body of the audio device. Audio devices may include, for example, sound systems integrated within a tablet computer, a smartphone, other types of mobile devices, a set-top box, a personal computer, a wearable computer, other types of computing devices, and so forth. Audio devices may also include stand-alone audio systems, such as portable devices for placement on a floor or other surface in a room. In addition to, or instead of, one or more electromechanical or electromagnetic speakers, an audio device may include one or more ultrasonic transducers, such as piezoelectric speakers or electrostatic speakers. Each ultrasonic transducer or set of ultrasonic transducers may be oriented to emit ultrasonic signals in a direction relative to the audio device. For example, a tablet computer may include ultrasonic transducers positioned on one or more of the front face, the back face, the top edge, the bottom edge, the left edge, or the right edge of the tablet computer. Other types of audio devices may similarly be provided with one or more ultrasonic transducers on surfaces, oriented in various directions relative to the audio device. For example, a stand-alone audio system for placement on a floor or table may include a cylindrical body with ultrasonic transducers placed about the circumference of the body. In some implementations, the ultrasonic transducers may be provided in strips, bands, sheets, or similar sections of a material, such as a polymer-based film. The material may be positioned on portions of the exterior of an audio device. In some implementations, a single sheet of material may include multiple sets of ultrasonic transducers that may be actuated independently of other sets of ultrasonic transducers.

To generate the appearance of audible sound emanating from locations other than the audio device, the ultrasonic transducers may emit ultrasonic carriers that are modulated with an audio signal associated with one or more surround channels, in one or more directions from the audio device. Passage through the air and contact with a wall or other object may demodulate the ultrasonic carrier such that the audio signal becomes audible. The wall or other object may reflect at least a portion of the audio signal toward the audio device, such that the audible sound appears to emanate from the wall or object, providing the user of the audio device with a surround sound experience.

In some implementations, the audio device may determine a distance to an object in one or more directions and generate an audio signal having an intensity that is based on the distance. The intensity of the audio signal may include amplitude, volume, loudness, and so forth. For example, if a wall or other object is located a significant distance from the audio device, the audio signal may be provided with a greater intensity to ensure that a user located proximate to the audio device is able to perceive the audible sound associated with the reflected audio signal. The intensity may be selected such that the audible sound that reaches the location of the audio device has a volume equal to or exceeding a threshold volume. The threshold volume may be selected by a user, determined by the audio content, and so forth. In other implementations, if a wall or other object is located a significant distance from the audio device, the audio signal may be provided with a lesser intensity to simulate a sound emanating from a source that is farther from the user.

The distance to one or more objects may be determined by emission of an ultrasonic pulse from one or more ultrasonic transducers. A wall or other object may reflect at least a portion of the ultrasonic pulse toward the audio device, and the reflected ultrasonic pulse may be received by an ultrasonic transducer or other type of receiver. For example, the ultrasonic transducers of the audio device may include ultrasonic emitters and ultrasonic receivers, such as a speaker and a microphone capable of emitting and receiving ultrasonic signals, respectively. In other implementations, a separate microphone capable of receiving ultrasonic signals may be used to receive reflected ultrasonic pulses. The distance to one or more objects may be determined based at least partially on the time at which an ultrasonic pulse is emitted and the time at which the reflected ultrasonic pulse is received by the audio device. In other implementations, the distance to one or more objects may be determined using other means, such as a range or depth camera, a location sensor (e.g., a Global Positioning System (GPS) receiver), a position sensor, a proximity sensor, and so forth. In some implementations, if an ultrasonic pulse is emitted and no corresponding reflected ultrasonic pulse is received by the audio device, the ultrasonic transducer that emitted that ultrasonic pulse may be deactivated. For example, if an audio device is positioned outdoors or in a large indoor space in which no wall or other object is located in a particular direction within range of the ultrasonic transducer, emission of an ultrasonic carrier in that direction may be ineffective due to the fact that no reflected audio signal would be provided to the user. Ultrasonic transducers that would not be effective may be deactivated, for example, to conserve power and computing resources, to reduce potential noise or interference, and so forth.

In some implementations, movement of the audio device may be determined, such as through use of an accelerometer, a location sensor, or a position sensor. For example, an accelerometer may detect movement of the audio device by an amount greater than a threshold quantity. Responsive to the determination of movement, the audio device may determine the distance to one or more objects based on an additional position of the audio device. For example, the ultrasonic transducers may emit an additional ultrasonic pulse in one or more directions to detect the presence of a wall or other object through receipt of reflected ultrasonic pulses. In other implementations, the reflected audio signal may be used to determine movement of the audio device. For example, the audio device may be configured to receive the reflected audio signal using one or more microphones. Movement of the audio device may cause the reflected audio signal to vary in intensity or one or more other characteristics, such as timing, frequency, pitch, and so forth. The audio device may modify one or more of the intensity or timing of subsequent audio signals emitted via one or more ultrasonic carriers based on a determination of movement. Modification of the intensity or timing of the audio signals may enable a user to perceive sound from different surround channels simultaneously (e.g., in sync), with each surround channel having an intensity corresponding to the distance across which the audio signal travels to reach the user.

In some implementations, an audio device may include one or more additional speakers, such as electromechanical or electromagnetic speakers, one or more displays, or other types of output devices. The additional speakers may be used to provide audio signals to a user in addition to the reflected audio signals received due to emission of the ultrasonic carriers by the ultrasonic transducers. In one implementation, piezoelectric speakers, electrostatic speakers, or other types of ultrasonic transducers may be used for providing audible signals at frequencies greater than 1,000 hertz (Hz), and electromechanical or electromagnetic speakers may be used to provide audio content at frequencies less than or equal to 1,000 Hz.

The length of time between emission of an ultrasonic carrier and perceivability of audible sound by a user may depend on the distance travelled by the ultrasonic carrier and the reflected audio signal. The ultrasonic transducers may emit an ultrasonic carrier in the direction of an object, such that demodulation of the ultrasonic carrier and contact with the object reflects the audio signal toward the audio device. In some implementations, a delay time based on the distance between an audio device and an object may be determined. Audio or video content provided to a speaker, a display, or another type of output device associated with the audio device may be provided subsequent to emission of the ultrasonic carriers, at an emission time determined by the delay time. The content provided to the speaker or display may therefore be perceived generally simultaneously as the reflected audio signal emitted by the ultrasonic transducers reaches the user. In other implementations, the delay time associated with a first ultrasonic carrier may be used to determine an emission time at which a second ultrasonic carrier is emitted by a different ultrasonic transducer, in a different direction. For example, an audio device may be positioned near an edge of a room, such that an ultrasonic carrier emitted in a first direction proximate to a first wall or object will be demodulated, resulting in a reflected audio signal reaching the position of the audio device more quickly than a reflected signal resulting from an ultrasonic carrier emitted in a second direction, toward a second wall or object that is farther from the audio device. Based on the distances to objects in one or more directions, the emission of multiple ultrasonic carriers may be timed such that reflected audio signals reach the position of the audio device at approximately the same time.

Implementations described in this disclosure may enable a user of an audio device to perceive audible sound from multiple directions without requiring equipment external to the audio device. The timing, intensity, or other characteristics of the audio signal emitted in a particular direction may be modified based on the distance between the audio device and an object in that direction to further improve the user experience. Movement of the audio device may be detected to facilitate modification of the audio signal as the distance between the audio device and one or more objects changes.

FIG. 1 depicts a system 100 for determining a position of an audio device 102 relative to one or more objects 104 and emitting audio signals 106 having an intensity, timing, or other signal characteristic determined using the distance "D"

between the audio device 102 and the one or more objects 104. The audio device 102 may include any type of device that may be used to produce sound within audible frequency ranges including computing devices, stand-alone audio systems, or other types of devices having a speaker, another type of transducer, or other equipment capable of converting signals to audible sound. FIG. 1 depicts the audio device 102 integrated within a tablet computer. In other implementations, the audio device 102 may be associated with a mobile device, a smartphone, a set-top box, a personal computer, a wearable computer, another type of computing device, and so forth, or the audio device 102 may include a stand-alone audio system.

The audio device 102 may include one or more input devices, storage media, and so forth, from which audio data 108 may be received or accessed. The audio data 108 may include any manner of content readable by the audio device 102 that includes an audio component, such as recorded music, speech, or other types of sounds. In some implementations, the audio data 108 may also include image data or video data that may be output using a display associated with the audio device 102. The audio device 102 may be configured to generate audio signals 106 using the audio data 108 and to emit the audio signals 106 using one or more speakers. For example, a signal generation module 110 associated with the audio device 102 may access the audio data 108 and signal data 112 indicative of one or more characteristics of an audio signal 106 to generate the audio signals 106. The audio signals 106 may be provided to one or more transducers, such as electromechanical or electromagnetic speakers, which may produce audible sound that appears to emanate from the audio device 102.

As described previously, the audio device 102 may include one or more ultrasonic transducers 114, such as piezoelectric or electrostatic speakers. Each ultrasonic transducer 114 may be oriented to emit ultrasonic signals in a direction relative to the audio device 102. For example, ultrasonic transducers 114 or sets of ultrasonic transducers 114 may be positioned on one or more of the front face, the back face, the top edge, the bottom edge, the left edge, or the right edge of the audio device 102. Each ultrasonic transducer 114 may be configured to emit ultrasonic signals in a direction outward from the surface or edge of the audio device 102 upon which the ultrasonic transducer 114 is positioned. An audio device 102 may include any number of ultrasonic transducers 114 configured to emit ultrasonic signals in any direction(s) relative to the audio device 102.

FIG. 1 depicts a first object 104(1) spaced a first distance D1 from the audio device 102 in a first direction, a second object 104(2) spaced a second distance D2 from the audio device 102 in a second direction, and a third object 104(3) spaced a third distance D3 from the audio device 102 in a third direction. In the depicted example system 100, the third distance D3 is greater than the first distance D1, and the first distance D1 is greater than the second distance D2. A distance module 116 associated with the audio device 102 may be used to determine the distances D between the audio device 102 and one or more of the objects 104. In some implementations, one or more of the ultrasonic transducers 114 may be used to emit an ultrasonic pulse toward one or more of the objects 104. One or more of the object(s) 104 may reflect at least a portion the ultrasonic pulse(s) toward the audio device 102, and the ultrasonic transducer(s) 114 may receive the reflected ultrasonic pulse(s). In other implementations, one or more microphones may receive the reflected ultrasonic pulses. A clock 118, which may be used to provide information indicative of date, time, ticks, and so forth, may be used to determine a time at which each ultrasonic pulse was emitted and a time at which each reflected ultrasonic pulse was received by the audio device 102. Clocks 118 may further be used to generate timestamps, trigger preprogrammed actions, and so forth. The distance module 116 may determine the distance D between the audio device 102 and an object 104 based at least partially on the time at which an ultrasonic pulse was emitted, and the time at which the ultrasonic pulse reflected by the object 104 was received by the audio device 102.

In other implementations, the distance D between the audio device 102 and an object 104 may be determined using one or more cameras or other image sensors. For example, one or more depth cameras (e.g., Red-Green-Blue plus Depth (RGB-D) cameras) or other types of time-of-flight (ToF), flash lidar, or range cameras may be used to generate image data corresponding to an object 104. The distance module 116 may include image processing or image recognition software that may be used to determine the object 104 within the image data and to determine the distance D between the audio device 102 and the object 104. In one implementation, image processing may be performed at least in part by using one or more tools available in the OpenCV library as developed by Intel Corporation of Santa Clara, Calif., USA; Willow Garage® of Menlo Park, Calif., USA; and Itseez of Nizhny Novgorod, Russia, with information available at www.opencv.org.

In still other implementations, the distance D between the audio device 102 and an object 104 may be determined using one or more location sensors, position sensors, and so forth. For example, a radio navigation-based system, such as a terrestrial or satellite-based navigational system, may be used to determine a current location of the audio device 102. Satellite-based navigational systems may include a Global Positioning System (GPS) receiver, a global navigation satellite system (GLONASS) receiver, a Galileo receiver, a BeiDou Navigation Satellite System (BDS) receiver, an Indian Regional Navigational Satellite System, and so forth. Position sensors may include proximity sensors, touch sensors, radio frequency identification (RFID) or near field communication (NFC) sensors, orientation sensors, three-dimensional (3D) sensors, and so forth. For example, one or more position sensors may be used to determine the relative position between the audio device 102 and one or more objects 104.

Independent of the manner in which the distances D between the audio device 102 and one or more objects 104 are determined, the signal generation module 110 may determine one or more characteristics of audio signals 106 based on determined distances D. Signal characteristics may be stored as signal data 112. The signal generation module 110 may generate ultrasonic carriers 120 for emission by the ultrasonic transducers 114. Each ultrasonic carrier 120 may be modulated using an audio signal 106 that corresponds to the direction in which the ultrasonic carrier 120 may be emitted.

For example, FIG. 1 depicts the ultrasonic transducers 114 emitting a first ultrasonic carrier 120(1) modulated with a first audio signal 106(1) toward the first object 104(1). Passage through the air and interaction with the first object 104(1) may cause demodulation of the first ultrasonic carrier 120(1), such that the first audio signal 106(1) becomes audible to a user associated with the audio device 102. The first object 104(1) may reflect at least a portion of the first audio signal 106(1) toward the audio device 102, creating the perception of audible sound, corresponding to the first audio signal 106(1), emanating from the first object 104(1).

The ultrasonic transducers 114 are also shown emitting a second ultrasonic carrier 120(2) modulated with a second audio signal 106(2) toward the second object 104(2). Passage through the air and interaction with the second object 104(2) may demodulate the second ultrasonic carrier 120(2). The second object 104(2) may reflect at least a portion of the second audio signal 106(2) toward the audio device 102, creating the perception of audible sound emanating from the second object 104(2). The ultrasonic transducers 114 are further shown emitting a third ultrasonic carrier 120(3) modulated with a third audio signal 106(3) toward the third object 104(3). Passage through the air and interaction with the third object 104(3) may demodulate the third ultrasonic carrier 120(3). The third object 104(3) may reflect at least a portion of the third audio signal 106(3) toward the audio device 102, creating the perception of audible sound emanating from the third object 104(3).

Each audio signal 106 generated by the signal generation module 110 may be provided with one or more characteristics based on the distance D to a respective object 104. For example, the third audio signal 106(3) is shown having an intensity (e.g., amplitude) greater than that of the first audio signal 106(1) and the second audio signal 106(2). The first audio signal 106(1) is shown having an intensity greater than that of the second audio signal 106(2) but less than that of the third audio signal 106(3). The second audio signal 106(2) is shown having an intensity less than that of the first audio signal 106(1) and the third audio signal 106(3). The intensity of each audio signal 106 may be determined, at least partially, using the distances D between the audio device 102 and one or more objects 104. For example, the third audio signal 106(3) may be provided with an amplitude greater than that of the other audio signals 106 because the third distance D3 between the audio device 102 and the third object 104(3) is greater than the first distance D1 and the second distance D2.

The greater amplitude of the third audio signal 106(3) may cause audible sound that reaches the location of the audio device 102 after traversing the third distance D3 to have a volume sufficient for perception by a user. For example, the audio data 108 used to generate the audio signal 106 may include data indicative of a threshold volume to be perceived by a user. The intensity of corresponding audio signals 106 may be determined based on this threshold volume and the distance D across which the audio signals 106 will travel. In other implementations, the intensity of audio signals 106 may be dynamically adjustable. For example, a user may adjust the volume of one or more surround channels associated with the audio device 102 during use. In some implementations, the audio device 102 may dynamically adjust the intensity of one or more audio signals 106 responsive to movement of the audio device 102 or detection of audible sound having a volume that deviates from the threshold volume by a predetermined amount.

The second audio signal 106(2) may be provided with an intensity less than that of the other audio signals 106 because the second distance D2 between the audio device 102 and the second object 104(2) is less than the first distance D1 and the third distance D3. The first audio signal 106(1) may be provided with an intensity greater than that of the second audio signal 106(2) and less than that of the third audio signal 106(3) because the first distance D1 is greater than the second distance D2 and less than the third distance D3.

In other implementations, the audio signals 106 may be provided with an intensity that decreases as the distance D to an object 104 increases. In still other implementations, other characteristics of audio signals 106 may be varied based on the distances D. For example, the pitch of an audio signal 106 or another type of audible effect (e.g., an echo effect or reverberation) may be provided to an audio signal 106 based on the corresponding distance D. In some implementations, the time at which each ultrasonic carrier 120 is emitted may be determined based on the distances D. For example, ultrasonic carriers 120 and audio signals 106 that travel a greater distance D may require a greater length of time for audible sound to reach the position of the audio device 102. Therefore, ultrasonic carriers 120 that correspond to greater distances D may be emitted prior to emission of ultrasonic carriers 120 that correspond to lesser distances D. As a result, reflected audio signals 106 may reach the position of the audio device 102 at approximately the same time.

Figure 2:
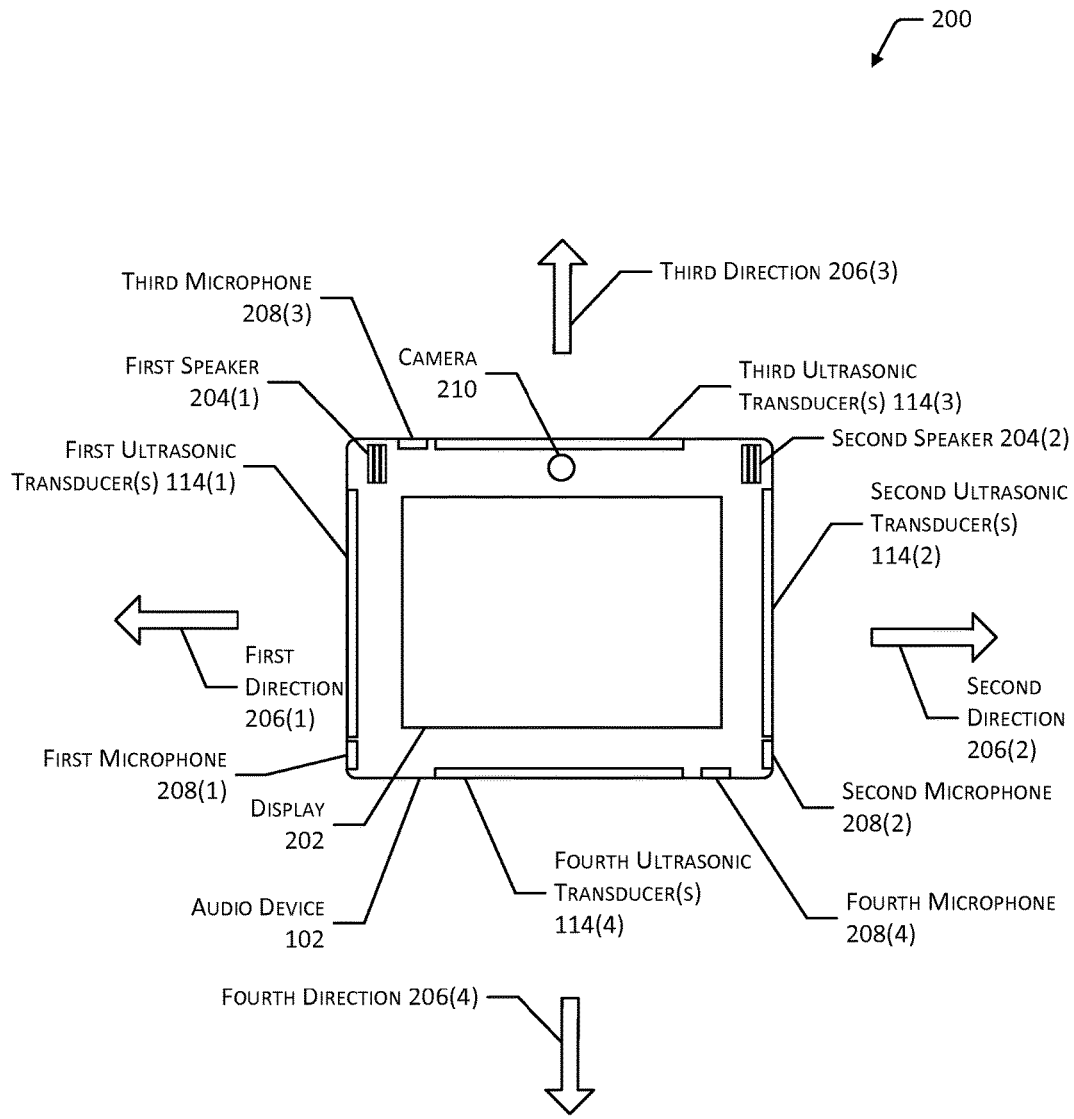
FIG. 2 depicts a diagram of an example audio device.

FIG. 2 depicts a diagram 200 of an example audio device 102 that may be used within the scope of the present disclosure. The depicted audio device 102 is integrated as part of a tablet computer. In other implementations, audio devices 102 associated with other types of computing devices or stand-alone audio devices 102 may be used. The audio device 102 may further include one or more computer-readable storage media (CRSM) for storing audio data 108, signal data 112, the signal generation module 110, the distance module 116, or other modules or data. In other implementations, the audio device 102 may communicate with one or more servers, other computing devices, or remote CRSM that may store one or more of the audio data 108, signal data 112, the signal generation module 110, the distance module 116, and so forth. The audio device 102 may include one or more hardware processors or may communicate with remote processors via one or more networks.

The depicted audio device 102 includes a display 202 configured to provide image or video content to a user. In some implementations, the display 202 may function as a touchscreen, having a touch sensor for receiving user input. The audio device 102 may include other types of input devices, such as one or more buttons (not shown), by which a user may interact with the audio device 102 and provide input thereto. The depicted audio device 102 further includes a first speaker 204(1) and a second speaker 204(2) positioned on a front side. For example, the first speaker 204(1) and second speaker 204(2) may include electromechanical or electromagnetic speakers that convert audio signals 106 to audible sound and emit the audible sound directly from the audio device 102. In other implementations, speakers 204 may be positioned on other surfaces of the audio device 102, such as the back face or edges of the audio device 102, in addition to or in place of the first speaker 204(1) and the second speaker 204(2). The audio device 102 may include one or more power sources, amplifiers, circuitry, and so forth, usable to drive the speakers 204 and other components of the audio device 102. For example, an audio device 102 associated with a tablet computer may include a non-linear class D amplifier. In other implementations, a class A, class B, class AB, or class C amplifier may be used.

The audio device 102 may also include one or more ultrasonic transducers 114 or sets of ultrasonic transducers 114, oriented in one or more directions 206 relative to the audio device 102. The ultrasonic transducers 114 may be used to emit and receive ultrasonic signals. One or more first ultrasonic transducers 114(1) are shown positioned on a left edge of the audio device 102, oriented to emit ultrasonic signals in a first direction 206(1), outward from the left edge of the audio device 102. One or more second ultrasonic transducers 114(2) are shown positioned on a right edge of the audio device 102, oriented to emit ultrasonic signals in a second direction 206(2), outward from the right edge of the audio device 102. One or more third ultrasonic transducers 114(3) are shown positioned on a top edge of the audio device 102, oriented to emit ultrasonic signals in a third direction 206(3), outward from the top edge of the audio device 102. One or more fourth ultrasonic transducers 114(4) are shown positioned on a bottom edge of the audio device 102, oriented to emit ultrasonic signals in a fourth direction 206(4), outward from the bottom edge of the audio device 102. In some implementations, each depicted ultrasonic transducer 114 may represent a set of multiple ultrasonic transducers 114. FIG. 2 depicts the ultrasonic transducers 114 oriented to emit ultrasonic signals in generally perpendicular directions 206 directly outward from the audio device 102. In other implementations, one or more ultrasonic transducers 114 may be oriented to emit ultrasonic signals in other directions between the depicted directions 206 (e.g., in diagonal directions), outward from the front or back faces of the audio device 102, and so forth.

FIG. 2 depicts the audio device 102 including four ultrasonic transducers 114 or sets of ultrasonic transducers 114 on the edges of the audio device 102. In other implementations, the audio device 102 may include ultrasonic transducers 114 oriented to emit ultrasonic signals outward from one or more of the front face or the back face of the audio device 102. Any number or orientation of ultrasonic transducers 114 may be used without departing from the scope of the present disclosure. FIG. 2 depicts the ultrasonic transducers 114 as generally rectangular strips, bands, sheets, or similar sections of a material, such as a polymer-based film. The depicted material may have one or more ultrasonic transducers 114 associated therewith. For example, multiple strips of material containing one or more ultrasonic transducers 114 may be positioned along the edges of a tablet computer. Other configurations of ultrasonic transducers 114 may be used with other types of audio devices 102. For example, a single sheet of material containing ultrasonic transducers 114 may be wrapped about the circumference of a cylindrical audio system. The ultrasonic transducers 114 within one or more sections of the sheet of material may be actuated independently of the ultrasonic transducers 114 in one or more other sections. For example, ultrasonic transducers 114 within a first section of the sheet of material may be oriented to emit signals in a first direction 206, and ultrasonic transducers 114 within a second section may be oriented to emit signals in a second direction 206. The signals emitted in the first direction 206 may have characteristics that differ from signals emitted in the second direction 206. In other implementations, one or more individual ultrasonic transducers 114 may be mounted within the body of the audio device 102, such as along the front face, back face, or edges of the body of the audio device 102. In some implementations, one or more ultrasonic transducers 114 may be movable such that an ultrasonic transducer 114 may be oriented in a particular direction 206 independent of the orientation of the audio device 102.

The ultrasonic transducers 114 may be used to emit ultrasonic carriers 120 modulated by audio signals 106. The intensity, or one or more other characteristics, of each audio signal 106 may be determined by the respective distance D between the audio device and an object 104 located in a respective direction 206. In some implementations, the ultrasonic transducers 114 may emit one or more ultrasonic pulses in the direction 206 in which the ultrasonic transducers 114 are oriented. An associated microphone 208 may be positioned relative to one or more of the ultrasonic transducers 114 and configured to receive one or more portions of the ultrasonic pulse(s) that are reflected toward the audio device 102 by an object 104. For example, FIG. 2 depicts a first microphone 208(1) positioned adjacent to the first ultrasonic transducer(s) 114(1), a second microphone 208(2) positioned adjacent to the second ultrasonic transducer(s) 114(2), a third microphone 208(3) positioned adjacent to the third ultrasonic transducer(s) 114(3), and a fourth microphone 208(4) positioned adjacent to the fourth ultrasonic transducer(s) 114(4). Any number of microphones 208 may be positioned at any location associated with the audio device 102. For example, in another implementation, a microphone 208 may be placed within a cut-out region located within a perimeter of an ultrasonic transducer 114. In other implementations, a single microphone 208 may be used to receive reflected ultrasonic signals emitted by multiple ultrasonic transducers 114. In still other implementations, one or more the ultrasonic transducer(s) 114 may also be used as an ultrasonic receiver, and use of a separate microphone 208 may be omitted.

Characteristics of the received ultrasonic pulse(s) such as the intensity or the time between emission and reception of the ultrasonic pulse(s) may be used to determine the distance D between the audio device 102 and an object 104. If an ultrasonic pulse is emitted, but no reflected ultrasonic pulse is received by the audio device 102, this may indicate that no object 104 is located in a particular direction 206 within range of the ultrasonic transducer 114. In some implementations, ultrasonic transducers 114 that do not receive a reflected ultrasonic pulse may be deactivated.

In other implementations, distances D to objects 104 in one or more directions 206 may be determined using other means, such as a camera 210 associated with the audio device 102. FIG. 2 depicts a camera 210 positioned on the front face of the audio device 102. In other implementations, one or more cameras 210 may be positioned on other surfaces of the audio device 102, such as the back face or edges. The camera(s) 210 may be used to generate image data associated with one or more objects 104 located in one or more directions 206 relative to the audio device 102. For example, one or more cameras 210 may include a range camera or depth camera. Image data associated with an object 104 may be processed to determine one or more distances D between the audio device 102 and one or more objects 104. As described previously, in other implementations, audio devices 102 may include position sensors, location sensors, and so forth, for determining the position of the audio device 102 relative to one or more objects 104. In some implementations, an audio device 102 may be positioned in a generally fixed location relative to one or more objects 104, such that the distances D to one or more objects 104 are known and remain generally constant.

Figure 3:
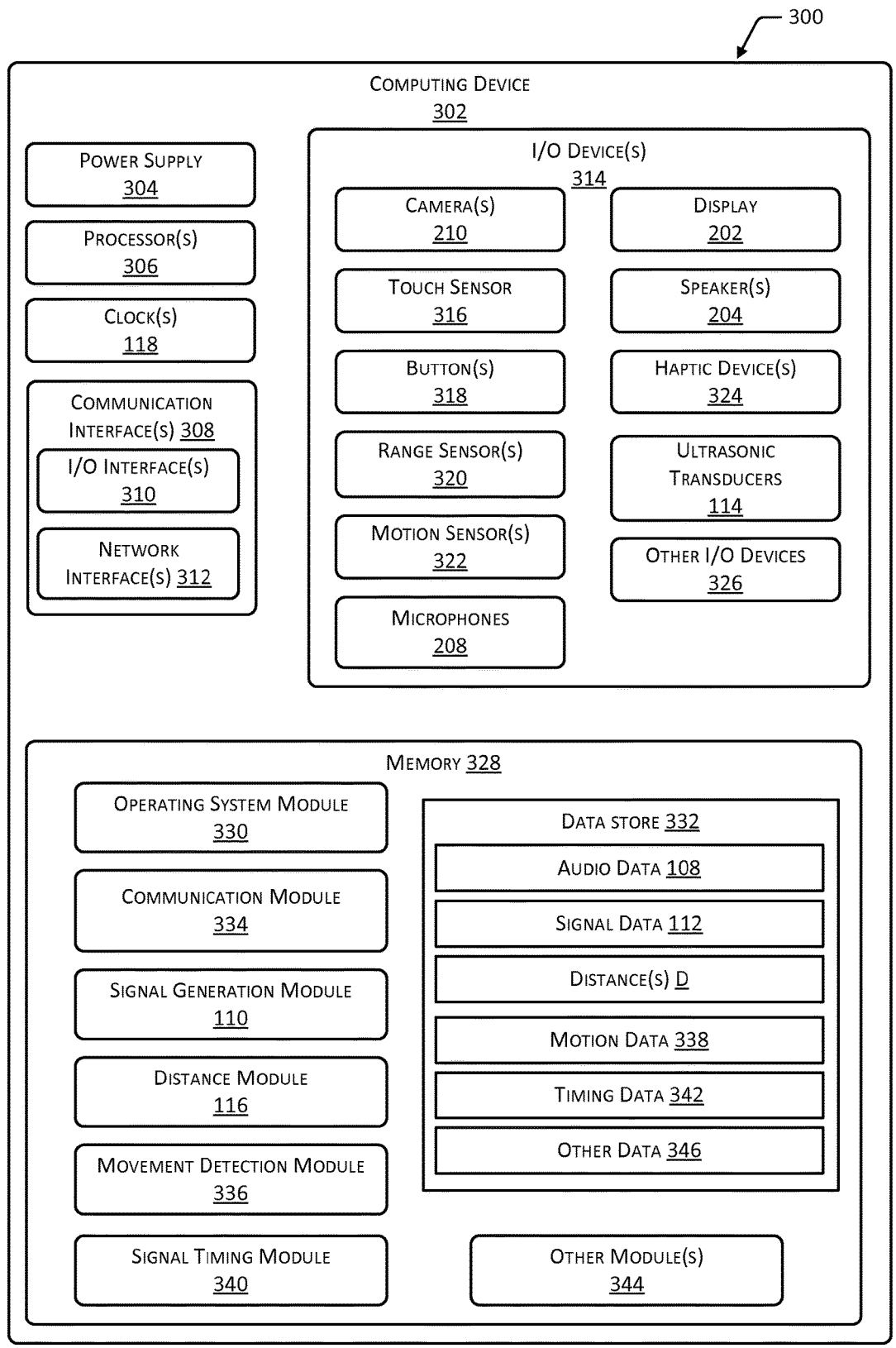
FIG. 3 is a block diagram of a computing device within the scope of the present disclosure.

FIG. 3 is a block diagram 300 of a computing device 302 configured to support operation of the system 100. The computing device 302 may include the audio device 102, one or more servers or other computing devices 302 in communication with the audio device 102, or one or more CRSM accessible to any of the computing devices 302. For example, the audio device 102 may be integral with a tablet computing device or another type of computing device 302. In other implementations, the audio device 102 may include a stand-alone audio system or a computing device 302 that is in communication with one or more servers, other computing devices 302, or CRSM via one or more networks.

One or more power supplies 304 may be configured to provide electrical power suitable for operating the components of the computing device 302. In some implementations, the power supply 304 may include a rechargeable battery, fuel cell, photovoltaic cell, power conditioning circuitry, and so forth.

The computing device 302 may include one or more hardware processor(s) 306 (processors) configured to execute one or more stored instructions. The processor(s) 306 may include one or more cores. One or more clocks 118 may provide information indicative of date, time, ticks, and so forth. For example, the processor(s) 306 may use data from the clock 118 to generate a timestamp, trigger a preprogrammed action, and so forth. A clock 118 may be used to determine a time at which one or more ultrasonic carriers 120 or audio signals 106 are emitted by an audio device 102 and a time at which one or more reflected audio signals 106 are received by the audio device 102. The length of time between emission and receipt of a signal may be used to determine a distance D to the object 104 that reflected the signal.

The computing device 302 may include one or more communication interfaces 308, such as input/output (I/O) interfaces 310, network interfaces 312, and so forth. The communication interfaces 308 may enable the computing device 302, or components of the computing device 302, to communicate with other devices or components. The I/O interfaces 310 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include any manner of input device or output device associated with an audio device 102, or a server or other computing device 302 in communication therewith. For example, I/O devices 314 may include input devices such as one or more cameras 210, a touch sensor 316, one or more buttons 318, which may include buttons 318 associated with a keyboard or mouse device, one or more microphones 208, and so forth. Input devices may also include one or more range sensors 320, which may include proximity sensors, location sensors, position sensors, infrared emitters and receivers, and so forth. Input devices may further include one or more motion sensors 322, which may include accelerometers, gyroscopes, and so forth, configured to determine motion of an audio device 102 or other computing device 302. Input devices may further include the ultrasonic transducers 114, which may include ultrasonic microphones configured to receive ultrasonic signals, such as reflected ultrasonic pulses. In other implementations, separate microphones 208 may be used to receive ultrasonic signals emitted by the ultrasonic transducers 114. I/O devices 314 may include output devices such as a display 202, one or more speakers 204, such as electromechanical or electromagnetic speakers, one or more haptic devices 324, and so forth. Output devices may also include the ultrasonic transducers 114, which may include ultrasonic emitters configured to emit ultrasonic signals, such as ultrasonic pulses and ultrasonic carriers 120 modulated by audio signals 106. The computing device 302 may further be associated with other I/O devices 326, such as additional display devices, speakers, cameras, or microphones external to the computing device 302. Other I/O devices 326 may also include location sensors, position sensors, proximity sensors, and so forth, that may be used to determine a location or position of an audio device 102. For example, the location or position of an audio device 102 may be used to determine the distance D between the audio device 102 and an object 104. In some implementations, the I/O devices 314 may be physically incorporated with the computing device 302 or may be externally placed.

The network interfaces 312 may be configured to provide communications between the computing device 302 and other devices, such as the I/O devices 314, routers, access points, and so forth. The network interfaces 312 may include devices configured to couple to one or more networks including local area networks (LANs), wireless LANs, wide area networks (WANs), wireless WANs, and so forth. For example, the network interfaces 312 may include devices compatible with Ethernet, Wi-Fi®, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 328. The memory 328 may include one or more CRSM. The CRSM may be any one or more of an electronic storage medium, a magnetic storage medium, an optical storage medium, a quantum storage medium, a mechanical computer storage medium, and so forth. The memory 328 may provide storage of computer-readable instructions, data structures, program modules, and other data for the operation of the computing device 302. A few example modules are shown stored in the memory 328, although the same functionality may alternatively be implemented in hardware, firmware, or as a system on a chip (SoC).

The memory 328 may include one or more operating system (OS) modules 330. The OS module 330 may be configured to manage hardware resource devices such as the I/O interfaces 310, the network interfaces 312, the I/O devices 314, and to provide various services to applications or modules executing on the processors 306. The OS module 330 may implement a variant of the FreeBSD® operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 332 and one or more of the following modules may also be stored in the memory 328. The modules may be executed as foreground applications, background tasks, daemons, and so forth. The data store 332 may use a flat file, database, linked list, tree, executable code, script, or other data structure to store information. In some implementations, the data store 332 or a portion of the data store 332 may be distributed across one or more other devices including other computing devices 302, network attached storage devices, and so forth.

A communication module 334 may be configured to establish communications with one or more other computing devices 302, such as audio devices 102 or one or more servers, storage media, or other computing devices 302 in communication therewith. The communications may be authenticated, encrypted, and so forth.

The memory 328 may store the signal generation module 110. The signal generation module 110 may access audio data 108, stored in the data store 332, corresponding to audible sound. For example, the audio data 108 may be representative of one or more audio signals 106 that may be provided to a speaker 204 or another type of transducer to produce audible sound. The audible sound may include one or more pitches, frequencies, amplitudes, or other audible effects, such as echo, reverberation, and so forth. The signal generation module 110 may further access signal data 112, stored in the data store 332, indicative of one or more signal characteristics, such as an intensity (e.g., amplitude), based on the distances D between an audio device 102 and one or more objects 104. The signal generation module 110 may generate audio signals 106 that include characteristics determined from one or more of the audio data 108, the signal data 112, or the distance(s) D. Audio signals 106 may be provided to the speaker(s) 204 for emission. The signal generation module 110 may further generate ultrasonic carriers 120 that may be modulated by the audio signals 106. The ultrasonic carriers 120 may be provided to the ultrasonic transducers 114 for emission. Emitted ultrasonic carriers 120 may be demodulated by passage through the air or other media, and through interaction with an object 104, such that the audio signal 106 becomes audible. At least a portion of the audio signal 106 may be reflected by the object 104 toward the audio device 102. In some implementations, one or more microphones 208 associated with the audio device 102 may receive reflected audio signals 106 to determine movement of the audio device 102 or the distance D between the audio device 102 and one or more objects 104.

The memory 328 may also store the distance module 116. The distance module 116 may determine the distance D between an audio device 102 and one or more objects 104. For example, the signal generation module 110 may cause the ultrasonic transducers 114 to emit one or more ultrasonic pulses in one or more directions 206 relative to the audio device 102. The clock(s) 118 may be used to determine times at which the ultrasonic pulse(s) were emitted and the times at which one or more reflected ultrasonic pulses are received by the ultrasonic transducers 114. Using the length of time between emission and detection of an ultrasonic pulse, the distance module 116 may determine the distance D between the audio device 102 and an object 104 located in the direction in which the ultrasonic pulse was emitted. In other implementations, the distance(s) D between the audio device 102 and one or more objects 104 may be determined using one or more cameras 210. For example, the camera(s) 210 may be used to generate image data corresponding to one or more objects 104. The distance module 116 may include image processing software for determining the objects 104 from the image data and for determining a distance D between the audio device 102 and an object 104 therefrom. Continuing the example, one or more of the cameras 210 may include range cameras or depth cameras. In still other implementations, the distance module 116 may determine the distance(s) D between the audio device 102 and one or more objects 104 using data from one or more range sensors 320, such as location sensors, position sensors, proximity sensors, and so forth, associated with the audio device 102. As described previously, the signal generation module 110 may access one or more of the determined distance(s) D, the signal data 112, or the audio data 108 to generate audio signals 106 and ultrasonic carriers 120. The audio signals 106 may include one or more characteristics, such as intensity, based at least partially on the distance D associated with the direction 206 in which the ultrasonic carrier 120 carrying the audio signal 106 is emitted. In some implementations, the distance module 116 may be configured to determine the distance D to an object 104 by determining one or more characteristics of a reflected audio signal 106 received by a microphone 208 associated with the audio device 102. For example, based on a variation in the intensity of a received audio signal 106, the distance module 116 may determine that the audio device 102 has been moved. An additional distance D corresponding to an object 104 may be determined based on the manner in which the received audio signal 106 deviates from the emitted audio signal 106.

The memory 328 may further store a movement detection module 336. The movement detection module 336 may receive motion data 338 from one or more motion sensors 322 associated with an audio device 102 to determine that the audio device 102 has been moved relative to one or more objects 104. In some implementations, the motion data 338 may be stored in the data store 332. In other implementations, the movement detection module 336 may receive sensor data from location sensors, position sensors, and so forth, to determine movement of the audio device 102. In still other implementations, the movement detection module 336 may receive data from microphones 208 or ultrasonic transducers 114 associated with the audio device 102 indicative of one or more characteristics of received audio signals 106 or received ultrasonic pulses. One or more of the motion data 338, sensor data, or characteristics of received signals may indicate movement of the audio device 102 relative to one or more objects 104. In some implementations, the motion data 338 may include one or more of a threshold distance or a threshold quantity of movement. The movement detection module 336 may determine when the audio device 102 has moved a distance or quantity that exceeds the threshold distance or threshold quantity of movement. If the audio device 102 has moved in a manner that exceeds a threshold quantity of movement, the distance module 116 may determine one or more additional distances D based on an additional position of the audio device 102. For example, responsive to a determination of movement, the ultrasonic transducers 114 may emit one or more ultrasonic pulses in one or more directions 206 for reflection by one or more objects 104, one or more camera(s) 210 may be used to visualize objects 104, or one or more other sensors may be used to determine a position of the audio device 102 relative to one or more objects 104.

The memory 328 may additionally store a signal timing module 340. The length of time between emission of an ultrasonic carrier 120 and receipt of a reflected audio signal 106 may vary for each emitted ultrasonic carrier 120 because the distances D between an audio device 102 and one or more objects 104 in various directions 206 may differ. Therefore, if each ultrasonic carrier 120 was emitted simultaneously, the reflected audio signals 106 may reach the position of a user operating the audio device 102 at different times, resulting in distorted, unsynchronized audible sound. Similarly, the reflected audio signals 106 may reach the position of the user at a different time than sound generated by electromechanical or electromagnetic speakers 204 associated with the audio device 102 or video content provided to a display 202 associated with the audio device 102. The signal timing module 340 may determine timing data 342, stored in the data store 332, associated with one or more emitted ultrasonic carriers 120 emitted by the ultrasonic transducers 114, audio signals 106 emitted by the speaker(s) 204, video content provided to the display 202, and so forth. The timing data 342 may include a delay time associated with one or more ultrasonic carriers 120 or audio signals 106 based on the respective distance(s) D determined for each signal. For example, a first ultrasonic carrier 120 corresponding to the greatest determined distance D may be emitted prior to emission of an ultrasonic carrier 120 corresponding to a lesser distance D. A delay time associated with the first ultrasonic carrier 120 may be permitted to lapse, determining an emission time corresponding to a subsequent ultrasonic carrier 120. The subsequent ultrasonic carrier 120 corresponding to the lesser distance D may in turn be emitted prior to emission of audio signals 106 using electromechanical speakers 204 mounted to an audio device 102. A delay time associated with the subsequent ultrasonic carrier 120 may be permitted to lapse, which may determine an emission time that corresponds to emission of the audio signals 106 using the electromechanical speakers 204. The delay times may be determined based on the distances D to one or more objects 104, which may correspond to at least a portion of the travel time associated with an audio signal 106. The travel time may include the length of time during which an audio signal 106 will travel from an audio device 102 to an object 104, then back to the audio device 102. The signal timing module 340 may therefore determine a time for emission of respective ultrasonic carriers 120 and other content such that reflected audio signals 106 and audible sound or video content emitted by components of the audio device 102, itself, reach a user at approximately the same time.

Other modules 344 may also be present in the memory 328. For example, user interface modules may receive selections of audio or video content from a user. Encryption modules may be used to encrypt and decrypt communications between computing devices 302. Data processing modules may be used to store, manipulate, or process generated audio data 108, video data, image data received from the cameras 210, and so forth. For example, audio processing modules may filter received audio signals 106 to determine one or more characteristics of the audio signals 106, which may be used to determine distances D or movement of the audio device 102. Other data 346 may include user input data, libraries, and other resources for performing audio or image recognition and audio or image processing, location data corresponding to positions of the audio device 102 or one or more objects 104 or structures, and so forth.

In different implementations, different computing devices 302 may have different capabilities or capacities. For example, server(s) in communication with an audio device 102 may have significantly more processor 306 capability and memory 328 capacity compared to the audio device 102 itself.

Figure 4:
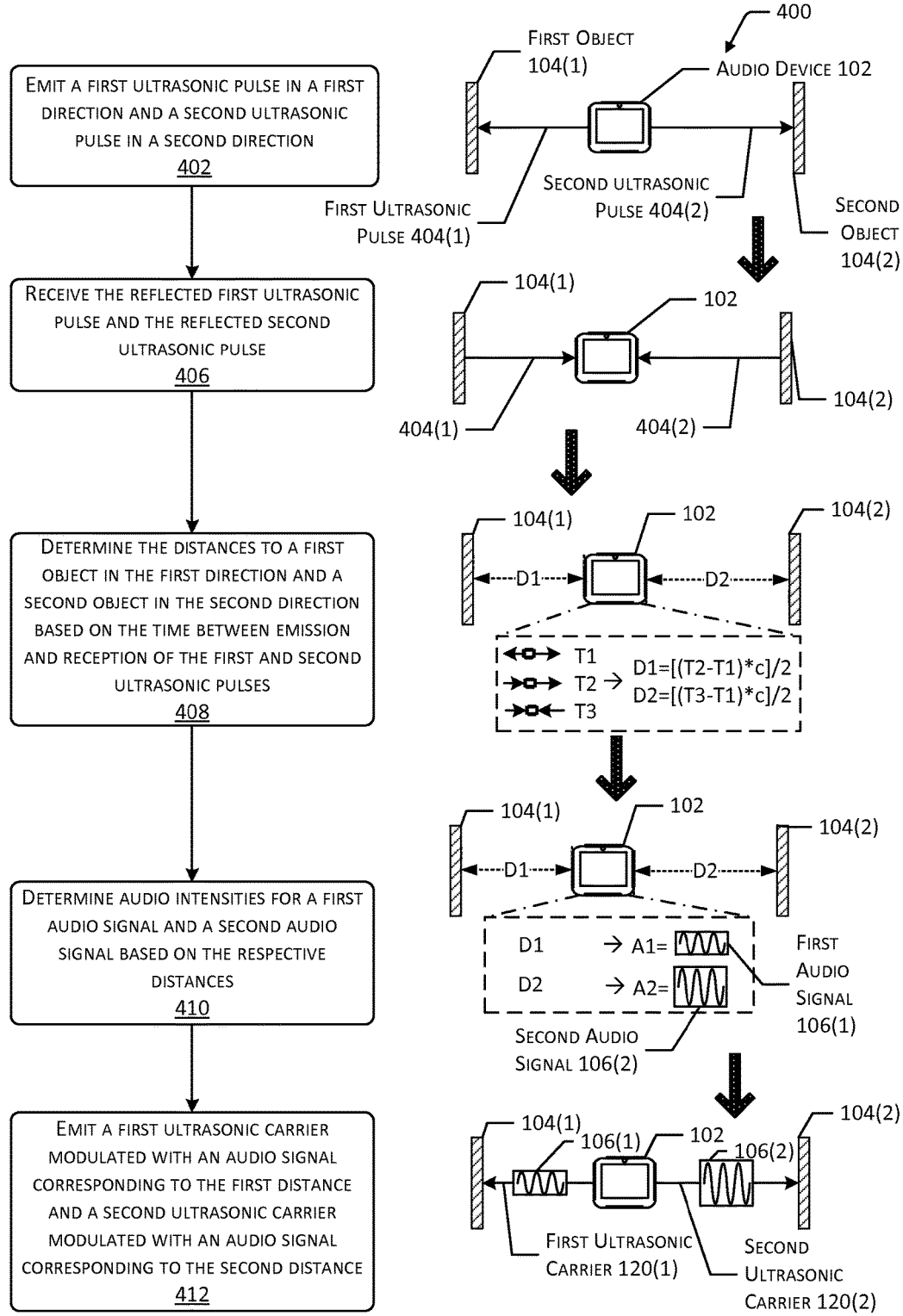
FIG. 4 depicts a method for determining distances between an audio device and one or more objects and emitting audio signals based on the distances.

FIG. 4 depicts a method 400 for determining distances D between an audio device 102 and one or more objects 104 and emitting audio signals 106 based on the distances. At 402, an audio device 102 emits a first ultrasonic pulse 404(1) in a first direction 206(1) (e.g., toward a first object 104(1)) and a second ultrasonic pulse 404(2) in a second direction 206(2) (e.g., toward a second object 104(2)). As described previously, the audio device 102 may include one or more ultrasonic transducers 114 adapted to emit ultrasonic signals, such as the ultrasonic pulses 404, and to receive ultrasonic signals reflected by objects 104. In some implementations, the ultrasonic pulses 404 may include a high-frequency signal having a generally short duration, such as an ultrasonic signal having a frequency ranging from 26 kilohertz (kHz) to 80 kHz and a duration of ten cycles. For example, at 26 kHz each cycle is about 0.038 milliseconds (ms), while at 80 kHz each cycle is about 0.0125 ms in duration. Continuing the example, the ten cycle duration at a frequency of 26 kHz would be about 0.38 ms and about 0.125 ms at 80 kHz.

At 406, the audio device 102 may receive the reflected first ultrasonic pulse 404(1) and the reflected second ultrasonic pulse 404(2). For example, the first ultrasonic pulse 404(1) may interact with a first object 104(1), such as a wall or other structure. The second ultrasonic pulse 404(2) may similarly interact with a second object 104(2). The objects 104 may reflect at least a portion of the ultrasonic pulses 404 toward the audio device 102. The ultrasonic transducers 114 may include microphones or another type of receiver configured to receive ultrasonic signals. In some implementations, each ultrasonic transducer 114 may include a microphone configured to receive a signal emitted by a corresponding ultrasonic emitter. In other implementations, one microphone may receive reflected signals emitted by multiple ultrasonic emitters. In still other implementations, a single ultrasonic emitter may emit an ultrasonic signal that may be received by multiple microphones.

At 408, the distances D to a first object 104(1) in the first direction 206(1) and a second object 104(2) in the second direction 206(2) may be determined based on the time between emission and reception of the first ultrasonic pulse 404(1) and the second ultrasonic pulse 404(2). For example, a distance module 116 associated with the audio device 102 may determine a time at which each ultrasonic pulse 404 was emitted and a time at which each corresponding reflected ultrasonic pulse 404 was received by the audio device 102. In the depicted method, both the first ultrasonic pulse 404(1) and the second ultrasonic pulse 404(2) were emitted at a time "T1." The reflected first ultrasonic pulse 404(1) was received at a time "T2." The reflected second ultrasonic pulse 404(2) was received at a time "T3." A first distance D1 between the audio device 102 and the first object 104(1) may be determined based on the times at which the first ultrasonic pulse 404(1) was emitted and received. For example, the time that lapsed as the first ultrasonic pulse 404(1) travelled from the audio device 102 to the first object 104(1), then back to the audio device 102 (e.g., two times the first distance D1) may be determined from the difference between T2 and T1. That difference may be multiplied by the speed of sound, then divided by two to determine the first distance D1 (e.g., $D1=[(T2-T1)*c]/2$). Similarly, the difference between T3 and T1 may be multiplied by the speed of sound, then divided by two to determine the second distance D2 (e.g., $D2=[(T3-T1)*c]/2$). One or more of the distances D, the speed of sound, the times, or one or more constants used to determine the distances D may be modified based on one or more characteristics of the location in which the audio device 102 is positioned. For example, ambient temperature, air pressure, humidity, and so forth, may affect the speed at which the ultrasonic pulses 404 travel, the functionality of the ultrasonic transducers 114, and so forth.

At 410, audio intensities for a first audio signal 106(1) and a second audio signal 106(2) may be determined based on the respective distances D. For example, a first audio signal 106(1) having a first intensity (e.g., amplitude) may be generated by a signal generation module 110 associated with the audio device 102. The first intensity may be determined at least partially using the first distance D1. A second audio signal 106(2) having a second intensity based at least partially on the second distance D2 may also be generated by the signal generation module 110 associated with the audio device 102. In the depicted method 400, the first distance D1 is less than the second distance D2. The depicted first audio signal 106(1) includes an intensity less than that of the second audio signal 106(2). The greater intensity of the second audio signal 106(2) may be used to increase the volume of audible sound that reaches the position of the audio device 102 after the second audio signal 106(2) is reflected by the second object 104(2). The first audio signal 106(1) may include a lesser intensity due to the lesser distance D1 across which the first audio signal 106(1) may travel. In other implementations, an audio signal 106 may be provided with a greater intensity as the corresponding distance D between the audio device 102 and an object 104 decreases. In still other implementations, audio signals 106 may be provided with other characteristics, such as pitch, echo, reverberation, and so forth, based on corresponding distances D.

At 412, the audio device 102 may emit a first ultrasonic carrier 120(1) modulated with a first audio signal 106(1) corresponding to the first distance D1 and a second ultrasonic carrier 120(2) modulated with a second audio signal 106(2) corresponding to the second distance D2. One or more ultrasonic transducers 114 associated with the audio device 102 may emit the first ultrasonic carrier 120(1) toward the first object 104(1). Passage through the air and interaction with the first object 104(1) may demodulate the first ultrasonic carrier 120(1), such that at least a portion of the first audio signal 106(1), having the determined intensity, is reflected toward the audio device 102 for perception by a user. One or more ultrasonic transducers 114 may also emit the second ultrasonic carrier 120(2) toward the second object 104(2). Passage through the air and interaction with the second object 104(2) may demodulate the second ultrasonic carrier 120(2), such that at least a portion of the second audio signal 106(2), having the determined intensity, is reflected toward the audio device 102 for perception by the user.

Figure 5:
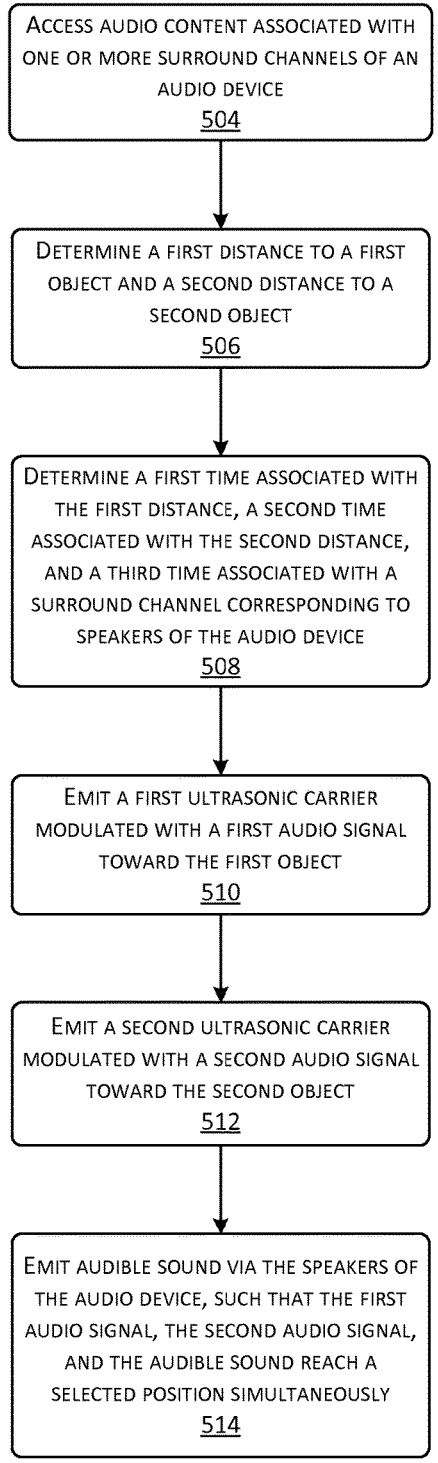
FIG. 5 depicts a method for determining times associated with emission of one or more signals to facilitate simultaneous perception of multiple signals by a user.
Figure 5:
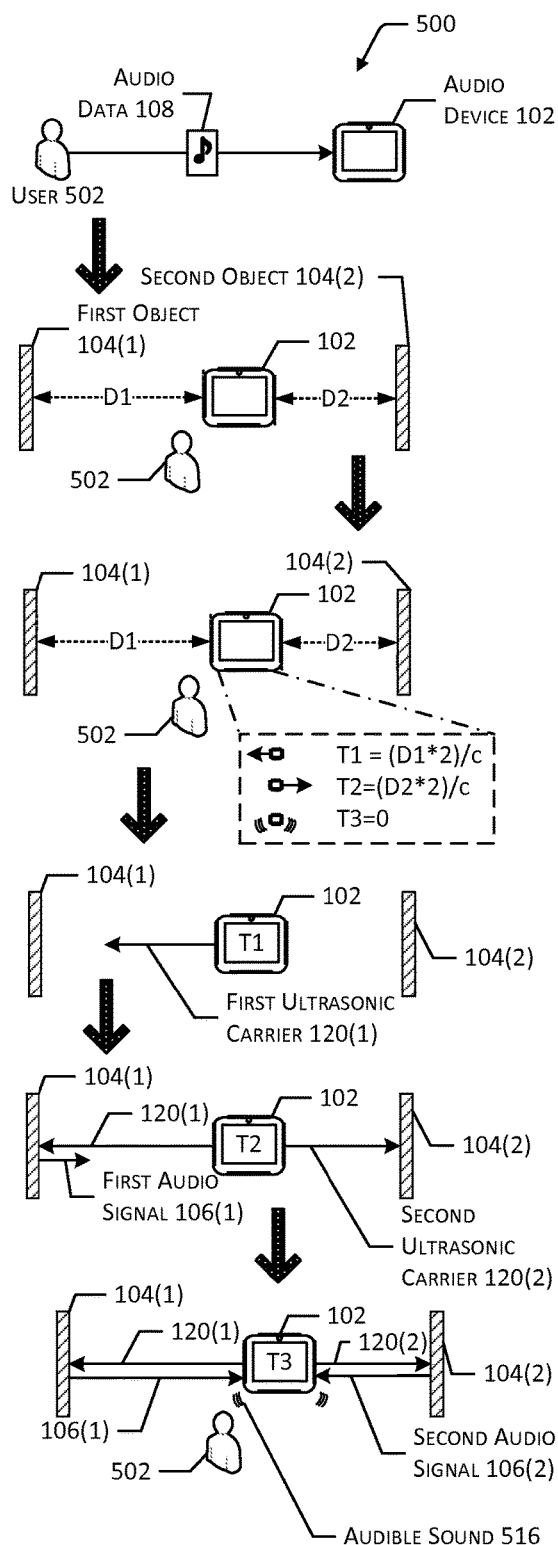

FIG. 5 depicts a method 500 for determining times associated with emission of one or more ultrasonic carriers 120 or audio signals 106 to facilitate simultaneous perception of multiple signals by a user 502. At 504, an audio device 102 may access audio content associated with one or more surround channels of the audio device 102. For example, a user 502 may provide audio data 108 to the audio device 102 for emission by one or more speakers 204, one or more ultrasonic transducers 114, or both speakers 204 and ultrasonic transducers 114. Each speaker 204 or set of speakers 204 or each ultrasonic transducer 114 or set of ultrasonic transducers 114 may correspond to a surround channel. Continuing the example, a first surround channel may correspond to audible sound emitted from electromechanical speakers 204 associated with the audio device 102, while additional surround channels may correspond to ultrasonic signals emitted from one or more ultrasonic transducers 114. In some implementations, the audio data 108 may also include image data or video data, which may be output using a display 202 associated with the audio device 102. In other implementations, a user 502 may select audio data 108 stored in association with the audio device 102 for emission, or the audio device 102 may access audio data 108 in the absence of user input.

At 506, the audio device 102 may determine a first distance D1 to a first object 104(1) and a second distance D2 to a second object 104(2). As described previously, in one implementation, the audio device 102 may emit one or more ultrasonic pulses 404 and receive the ultrasonic pulses 404 that are reflected by the objects 104. In other implementations, the audio device 102 may determine a distance D to one or more objects 104 using a range or depth camera 210, one or more location sensors, position sensors, or proximity sensors, and so forth. For example, the audio device 102 or a computing device 302 in communication therewith may access structural or geographic data indicative of the position of walls or other objects 104, which may be used in combination with data from one or more locations sensors to determine the distances D between the audio device 102 and one or more objects 104. In still other implementations, the first distance D1 and the second distance D2 may be input by a user 502. For example, the audio device 102 may include a stand-alone audio system configured for placement in a generally fixed location during use. Because the generally fixed location of the audio device 102 and the location of one or more objects 104 relative to that fixed location may be known by a user 502, the user 502 may input the distances D between the audio device 102 and the objects 104.

At 508, the audio device 102 may determine a first time associated with the first distance D1, a second time associated with the second distance D2, and a third time associated with a surround channel corresponding to speakers 204 of the audio device 102. For example, a first time "T1" associated with the first distance D1 may be determined based on the time that may pass between emission of an ultrasonic carrier 120 modulated with a first audio signal 106(1) to the first object 104(1) and receipt of the reflected first audio signal 106(1) proximate to the audio device 102. The first time T1 may therefore be determined by multiplying the first distance D1 by two and dividing the result by the speed of sound (e.g., T1=(D1*2)/c). Similarly, a second time "T2" associated with the second distance D2 may be determined by multiplying the second distance D2 by two and dividing the result by the speed of sound (e.g., T2=(D2*2)/c). Audio content emitted using speakers 204 at the location of the audio device 102 may produce audible sound emanating directly from the audio device 102. Therefore, a third time "T3" associated with the content emitted by the speakers 204 may be zero. In other implementations, a time associated with audible sound using the speakers 204 may be determined based on a position other than the location of the audio device 102. For example, an audio device 102 may be configured such that a user 502 operating the audio device 102 is positioned in a known location relative to the speakers 204. The third time T3 associated with audible sound using the speakers 204 and first time T1 and second time T2 associated with the distances D may be determined using the expected position of the user 502 rather than the current location of the audio device 102. A signal timing module 340 associated with the audio device 102 may determine the times associated with the distances D and with the audible sound emitted by the speakers 204. The signal timing module 340 may further determine an emission time at which ultrasonic carriers 120 and audio content associated with the speakers 204 of the audio device 102 may be emitted, relative to one another, to synchronize a user experience. For example, the signal timing module 340 may determine a delay time associated with one or more signals, and the one or more signals may be emitted after a lapse of an associated delay time.

At 510, the audio device 102, at a first time T1, may emit a first ultrasonic carrier 120(1) modulated with a first audio signal 106(1) toward the first object 104(1). In the depicted method 500, the first distance D1 is greater than the second distance D2. Therefore, the first ultrasonic carrier 120(1) and first audio signal 106(1) may travel from the audio device 102 to the first object 104(1) and then back to the audio device 102 in a greater length of time than another signal may traverse the second distance D2. The first ultrasonic carrier 120(1) may therefore be emitted prior to emission of a second ultrasonic carrier 120(2) toward the second object 104(2) and emission of content via the speakers 204.

At 512, the audio device 102, at a second time T2, may emit a second ultrasonic carrier 120(2) modulated with a second audio signal 106(2) toward the second object 104(2). The second ultrasonic carrier 120(2) may be emitted after emission of the first ultrasonic carrier 120(1) and before emission of content via the speakers 204. Emission of the first ultrasonic carrier 120(1) and the second ultrasonic carrier 120(2) may be timed, based on the distances D to the objects 104, such that the reflected first audio signal 106(1) and the reflected second audio signal 106(2) reach the audio device 102, or another selected position, at approximately the same time.

At 514, the audio device 102, at a third time T3, may emit audible sound 516 via the speakers 204 of the audio device 102. Emission of the audible sound 516 and the ultrasonic carriers 120 may be timed such that the first audio signal 106(1), the second audio signal 106(2), and the audible sound 516 each reach a selected position simultaneously, for perception by the user 502.

Figure 6:
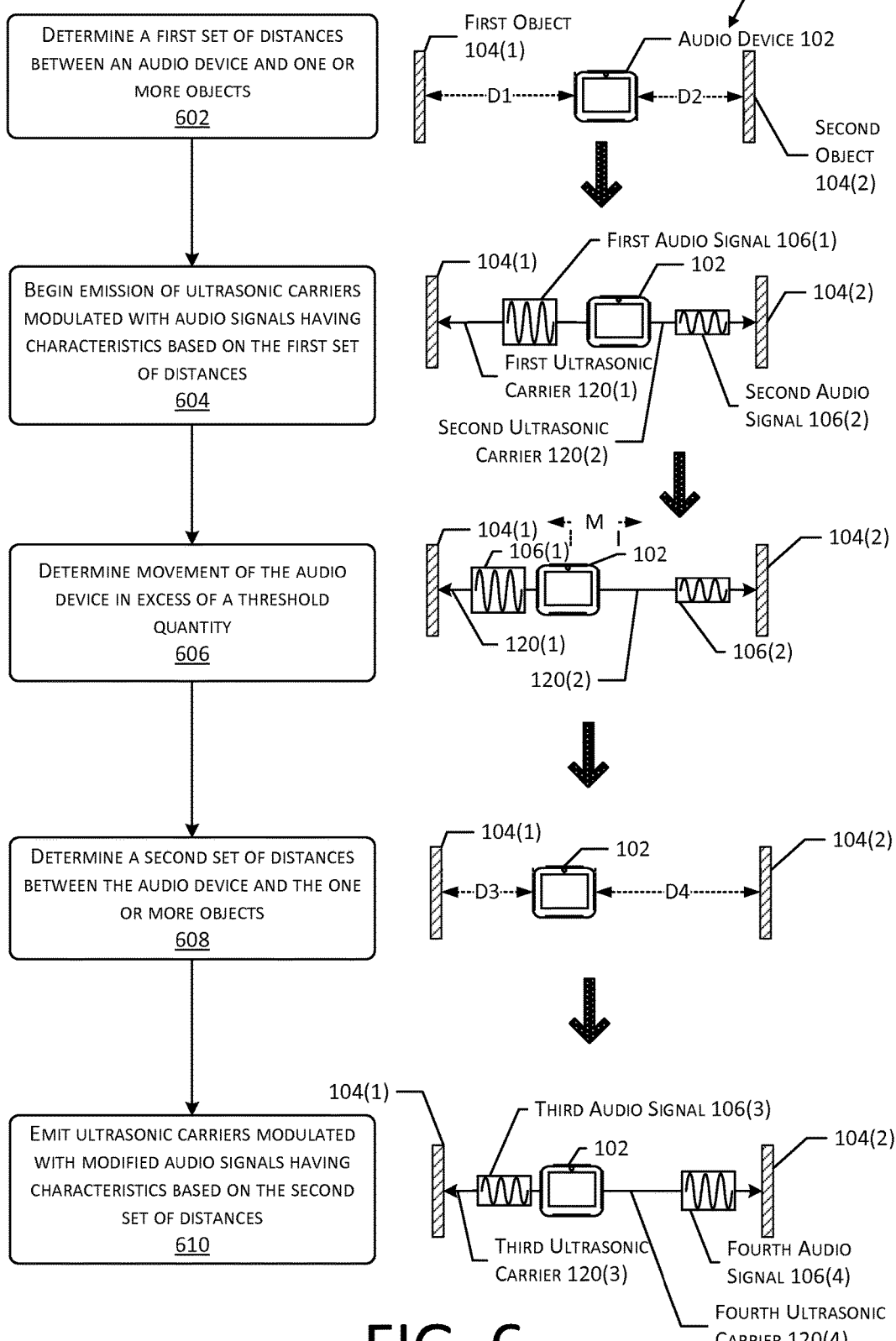
FIG. 6 depicts a method for determining movement of an audio device and emitting modified audio signals based on an additional position of the audio device.

FIG. 6 depicts a method 600 for determining movement of an audio device 102 and emitting modified audio signals 106 based on an additional position of the audio device 102. At 602, the audio device 102 may determine a first set of distances D between the audio device 102 and one or more objects 104. As described previously, the audio device 102 may emit one or more ultrasonic pulses 404 and receive the ultrasonic pulses 404 that are reflected by the objects 104. In other implementations, the audio device 102 may determine a distance D to one or more objects 104 using a range or depth camera 210, or the audio device 102 may determine a position relative to one or more objects 104 using location sensors, position sensors, or proximity sensors, and so forth. In other implementations, distances D between the audio device 102 and one or more objects 104 may be input by a user 502. In the depicted method 600, the audio device 102 is positioned a first distance D1 from a first object 104(1) and a second distance D2 from a second object 104(2).

At 604, the audio device 102 may begin emission of ultrasonic carriers 120 modulated with audio signals 106. The audio signals 106 may have characteristics, such as intensity, that are based at least partially on the first set of distances D associated therewith. For example, a first ultrasonic carrier 120(1) may be modulated by a first audio signal 106(1) having a first intensity. The first intensity may be determined at least partially using the first distance D1. The first ultrasonic carrier 120(1) may be emitted toward the first object 104(1), such that upon demodulation of the first ultrasonic carrier 120(1), the first audio signal 106(1) may be reflected toward the audio device 102. A second ultrasonic carrier 120(2) may be modulated by a second audio signal 106(2) having a second intensity. The second intensity may be determined at least partially using the second distance D2. The second ultrasonic carrier 120(2) may be emitted toward the second object 104(2), such that upon demodulation of the second ultrasonic carrier 120(2), the second audio signal 106(2) may be reflected toward the audio device 102. In the depicted method, the first distance D1 is greater than the second distance D2. Due to the difference between the first distance D1 and the second distance D2, the intensity of the first audio signal 106(1) generated by the audio device 102 is greater than the intensity of the second audio signal 106(2).

At 606, the audio device 102 may determine movement of the audio device 102 in excess of a threshold quantity. In some implementations, a motion sensor 322 associated with the audio device 102 may determine the movement. A movement detection module 336 may determine the amount of movement of the audio device 102 based on data from the motion sensor 322. If the detected movement exceeds a threshold quantity, which may be stored as motion data 338, the movement detection module 336 may indicate a determination of movement. In some implementations, if the detected movement does not exceed a threshold quantity, the motion may be disregarded. For example, small movements consistent with a user 502 holding a portable audio device 102 may not affect the sound perceived by the user 502 to a measurable extent. Larger movements consistent with a user 502 traveling from a first location to a second location, such as a different building or a different room within a building, may result in the audio device 102 achieving an additional position characterized by different distances D from one or more other objects 104. In other implementations, movement of an audio device 102 may be determined using one or more cameras 210, location sensors, position sensors, and so forth. In one implementation, movement of the audio device 102 may be determined by receiving reflected audio signals 106 and determining one or more characteristics of the audio signals 106. For example, movement of the audio device 102 closer to a wall or other object 104 may cause audio signals 106 reflected by that object 104 to have a louder volume. One or more microphones 208 associated with the audio device 102 may receive reflected audio signals 106. Determination of a variation in the received audio signals 106 may result in a determination of movement in excess of a threshold quantity. In other implementations, the audio device 102 may periodically emit ultrasonic pulses 404 to determine distances D associated with one or more objects 104. Movement of the audio device 102 may be determined using the periodic emission of the ultrasonic pulses 404. For example, if a reflected ultrasonic pulse 404 indicates a different value for a previously-determined distance D, this may indicate that the audio device 102 has moved. In still other implementations, additional distances D corresponding to an additional position of the audio device 102 may be received through user input. In the depicted method 600, a quantity of movement "M" associated with the audio device 102 may be determined. Specifically, the audio device 102 has moved toward the first object 104(1) and away from the second object 104(2).

At 608, responsive to the determination of movement M, the audio device 102 may determine a second set of distances D between the audio device 102 and the one or more objects 104. Using ultrasonic pulses 404, cameras 210, other types of sensors, user inputs, and so forth, the audio device 102 may determine a third distance D3 between the audio device 102 and the first object 104(1), and a fourth distance D4 between the audio device 102 and the second object 104(2).

At 610, the audio device 102 may emit ultrasonic carriers 120 modulated with modified audio signals 106 having characteristics based on the second set of distances D. For example, in the depicted method 600, the third distance D3 is less than the first distance D1. Therefore, a third audio signal 106(3) having an intensity less than that of the first audio signal 106(1) may be used to modulate a third ultrasonic carrier 120(3) that is emitted toward the first object 104(1). The depicted fourth distance D4 is greater than the second distance D2. Therefore, a fourth audio signal 106(4) having an intensity greater than that of the second audio signal 106(2) may be used to modulate a fourth ultrasonic carrier 120(4) that is emitted toward the second object 104(2).

Figure 7:
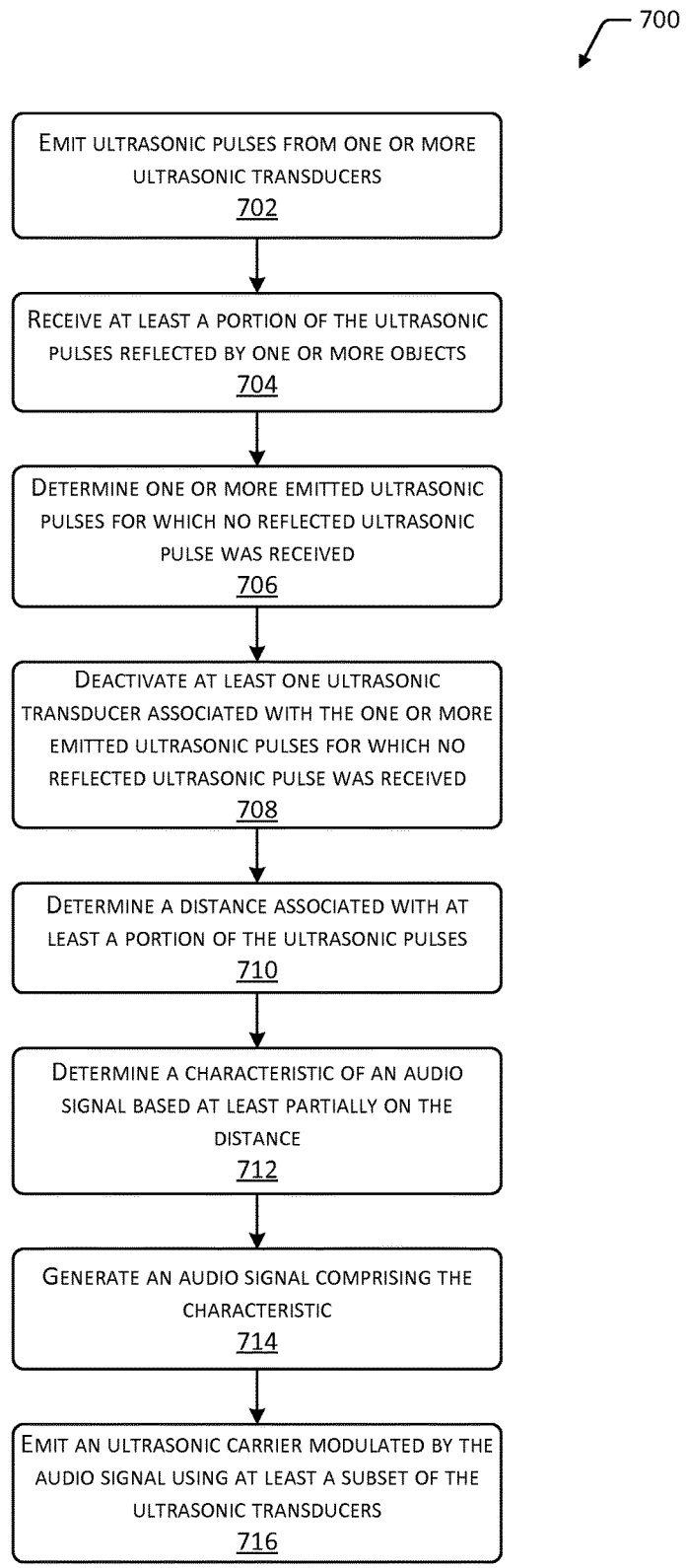
FIG. 7 is a flow diagram illustrating a method for generating audio signals based on distances determined using ultrasonic pulses.

FIG. 7 is a flow diagram 700 illustrating a method for generating audio signals 106 based on distances D determined using ultrasonic pulses 404. Block 702 emits ultrasonic pulses 404 from one or more ultrasonic transducers 114. For example, an audio device 102 may include one or more ultrasonic transducers 114 or sets of ultrasonic transducers 114 positioned on one or more surfaces or edges of the audio device 102. Each ultrasonic transducer 114 may be oriented in a direction 206. In some implementations, an ultrasonic pulse 404 may include a high-frequency signal (e.g., from 26 to 80 kHz) having a generally short duration (e.g., 10 cycles).

Block 704 receives at least a portion of the ultrasonic pulses 404 reflected by one or more objects 104. When emitted from an ultrasonic transducer 114, an ultrasonic pulse 404 may travel in the direction 206 in which the ultrasonic transducer 114 is oriented until the ultrasonic pulse 404 contacts an object 104. Interaction with the object 104 may cause at least a portion of the ultrasonic pulse 404 to be reflected toward the ultrasonic transducer 114 from which the ultrasonic pulse 404 was emitted. In other implementations, the ultrasonic pulse 404 may be received by a separate microphone 208 or other device configured to receive reflected ultrasonic pulses 404.

Block 706 determines one or more emitted ultrasonic pulses 404 for which no reflected ultrasonic pulse 404 was received. Depending on the distance D between the audio device 102 and one or more objects 104 in each direction 206, all, a portion, or none of the emitted ultrasonic pulses 404 may be reflected toward the ultrasonic transducers 114. For example, depending on the type of amplifier, power source, and ultrasonic transducer 114 used to generate and emit an ultrasonic pulse 404, the range of the ultrasonic transducer 114 may be limited. An ultrasonic pulse 404 may dissipate to a degree that the ultrasonic pulse 404 may no longer be detected by the ultrasonic transducer 114 after the ultrasonic pulse 404 has travelled a distance D equal to or exceeding the range of the ultrasonic transducer 114.

Block 708 deactivates at least one ultrasonic transducer 114 associated with one or more emitted ultrasonic pulses 404 for which no reflected ultrasonic pulse 404 was received. For example, if no wall or other object 104 is present within the range of and in the direction 206 in which an ultrasonic transducer 114 is oriented, then emission of signals from that ultrasonic transducer 114 may be ineffective. Ineffective ultrasonic transducers 114 may be deactivated to conserve power, to reduce noise, and so forth. In some implementations, responsive to a determination of movement of an audio device 102 associated with the ultrasonic transducer 114, the ultrasonic transducer 114 may emit an additional ultrasonic pulse 404 to determine the presence of one or more objects 104 within range of the ultrasonic transducer 114. If the presence of an object 104 is determined, the ultrasonic transducer 114 may again be activated. In other implementations, one or more ultrasonic transducers 114 may periodically emit an ultrasonic pulse 404 to determine current distances D between the ultrasonic transducer(s) 114 and one or more objects 104.

Block 710 determines a distance D associated with at least a portion of the ultrasonic pulses 404. For example, based on the time at which an ultrasonic pulse 404 is emitted, the time at which a reflected ultrasonic pulse 404 is received, and the speed of sound, the distance D travelled by the ultrasonic pulse 404 and the distance D between the ultrasonic transducer 114 and an object 104 that reflected the ultrasonic pulse 404 may be determined. In some implementations, ambient conditions, such as temperature, air pressure, humidity, and so forth, may be determined, and the determined distance D may be modified using all or a portion of the determined ambient conditions. In other implementations, characteristics of the ultrasonic pulse 404 may be used to determine the distance D. For example, the extent to which an ultrasonic pulse 404 has dissipated or otherwise been affected by passage through the air or interaction with an object 104 may be used to determine the distance D across which the ultrasonic pulse 404 travelled.

Block 712 determines a characteristic of an audio signal 106 to be emitted, based at least partially on a determined distance D. For example, an audio signal 106 may be provided with a selected intensity, pitch, or other effect, such as echo or reverberation, based on the distance D associated with a particular ultrasonic transducer 114. A signal generation module 110 may access signal data 112, indicative of one or more characteristics of an audio signal 106 or a relationship between a characteristic of an audio signal 106 and one or more distances D.

Block 714 generates data indicative of an audio signal 106 to be emitted, the audio signal 106 comprising the determined characteristic. The signal generation module 110 may access audio data 108 indicative of audio content, such as audible sound, for emission. One or more of the audio data 108, signal data 112, distances D, or other data 346 may be used for generation of audio signals 106 for emission. The signal generation module 110 may further be used to generate one or more ultrasonic carriers 120 that may be modulated using generated audio signals 106.

Block 716 emits an ultrasonic carrier 120 modulated by the audio signal 106 using at least a subset of the ultrasonic transducers 114. The ultrasonic carrier 120 may be demodulated by the air or interaction with an object 104, which may cause the audio signal 106 to become audible. At least a portion of the audio signal 106 may be reflected by the object 104 toward the ultrasonic transducer 114 from which the ultrasonic carrier 120 was emitted.

Figure 8:
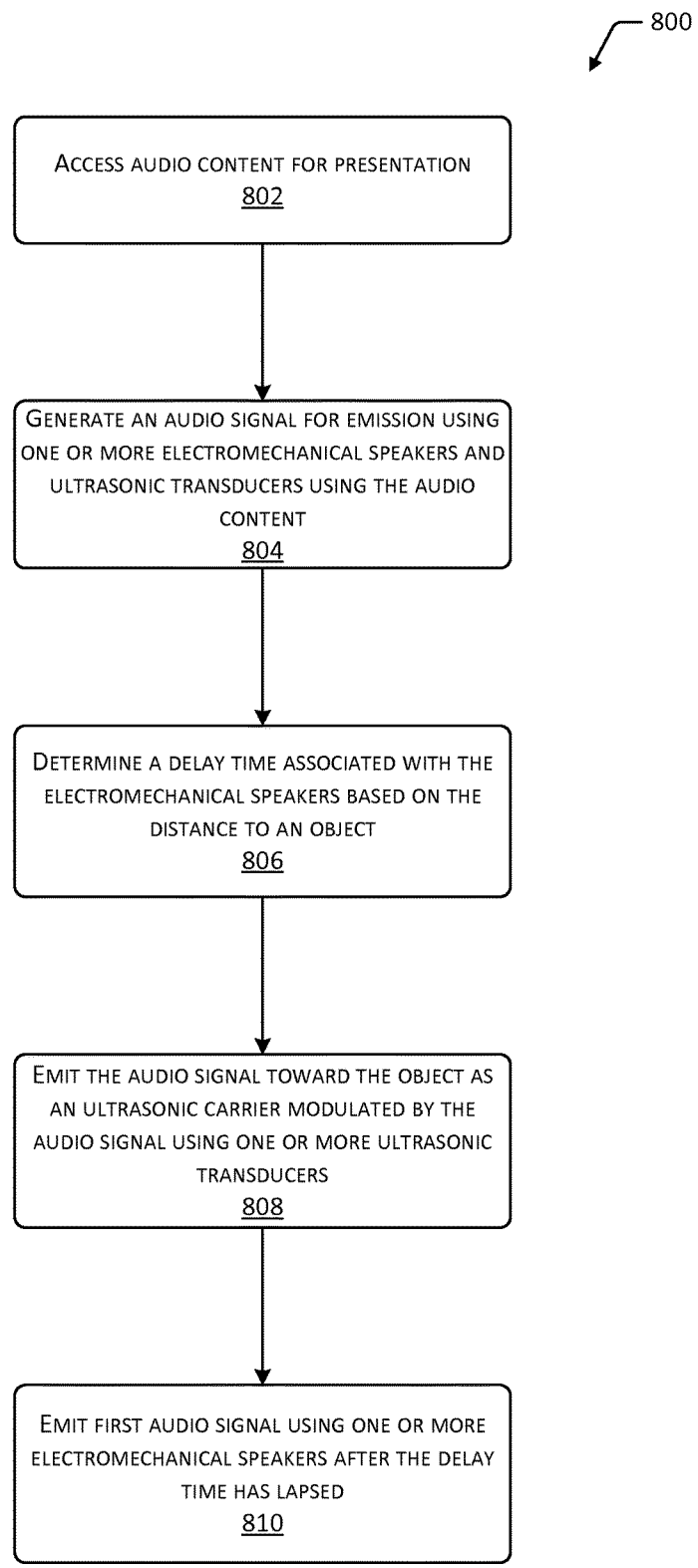
FIG. 8 is a flow diagram illustrating a method for generating audio signals based on characteristics of audio content.

FIG. 8 is a flow diagram 800 illustrating a method for generating audio signals 106 based on characteristics of audio content. Block 802 accesses audio content for presentation. Audio content may include any manner of audio data 108 that may be provided as a signal to a speaker 204 or another type of transducer for emission as audible sound 516. In some implementations, image data (e.g., text, pictures, and so forth) or video data may be associated with the audio data 108. Audio data 108 may be received from a user 502 or accessed from one or more CRSM associated with an audio device 102.

Block 804 generates an audio signal 106 for emission, using one or more electromechanical speakers 204 and ultrasonic transducers 114. The audio signal 106 may be generated using the audio content. Use of both electromechanical speakers 204 and ultrasonic transducers 114 to emit an audio signal 106 may enhance a user experience. For example, a generated audio signal 106 may include portions of the audio content having frequencies less than or equal to 1000 Hz. One or more types of ultrasonic transducers 114, such as piezoelectric or electrostatic speakers, may be incapable of emitting, at a volume perceivable by a user 502, audio signals 106 corresponding to audible sound 516 having a frequency less than 1000 Hz. Additionally, electromechanical speakers 204 may provide a quality of sound that enhances the user experience. An audio device 102 may include one or multiple types of speakers 204 adapted to emit audible sound 516 at different ranges of frequencies. For example, a subwoofer may be used to emit audible 516 sound having frequencies ranging from 20 to 200 Hz. A mid-range speaker 204 may be used to emit audible sound 516 having frequencies ranging from 200 to 5,000 Hz. A tweeter may be used to emit audible sound 516 having frequencies ranging from 2,000 to 20,000 Hz. Ultrasonic transducers 114 may be used to emit signals in the ultrasonic frequency ranges, which may include frequencies greater than 20,000 Hz.

Block 806 determines a delay time associated with the electromechanical speakers 204 based on the distance D between the audio device 102 and an object 104. The second audio signal 106 may be adapted for emission, using one or more ultrasonic transducers 114, in a direction 206 relative to the audio device 102. An ultrasonic carrier 120 emitted by the ultrasonic transducers 114 may travel across the distance D prior to interaction with the object 104. The object 104 may reflect at least a portion of the audio signal 106 used to modulate the ultrasonic carrier 120 toward the audio device 102 as audible sound for perception by a user 502. Travel of the audio signal 106 to the object 104 and then back to the audio device 102 may occur in a greater length of time than emission of the audio signal 106 from speakers 204 associated with the audio device 102. Therefore, emission of the audio signal 106 by the speakers 204 may be delayed. Delaying emission of the audio signal 106 by the speakers 204 may enable audible sound 516 emitted by the speakers 204 and audible sound 516 reflected by the object 104 to reach a user 502 operating the audio device 102 at approximately the same time. In implementations in which the audio content is associated with video content, a delay time before presentation of the video content may be determined in a similar manner to synchronize perception of audio and video content by a user 502.

Block 808 emits the audio signal 106 toward the object 104 as an ultrasonic carrier 120 modulated by the audio signal 106. The audio signal 106 may be emitted using one or more ultrasonic transducers 114. As described previously, each ultrasonic transducer 114 may be oriented in a direction 206. The ultrasonic carrier 120 may become demodulated by passage through the air and interaction with an object 104, such that the audio signal 106 becomes audible. Portions of the audio signal 106 reflected by the object 104 toward the audio device 102 may be perceived as audible sound 516 by the user 502.

Block 810 emits the audio signal 106 using one or more electromechanical speakers 204 after the delay time has lapsed. Because the distance D between the electromechanical speakers 204 and an expected position of a user 502 may be less than the distance D between the audio device 102 and the object 104, perception of audible sound 516 by the user 502 may be synchronized. By delaying emission of the audio signal 106 from the speakers 204 until the delay time has lapsed, the audio signal 106 may be emitted by the speakers 204 at the approximate time that the reflected audio signal 106, emitted by the ultrasonic transducers 114, will reach the position of the audio device 102. As a result, audible sound 512 from both the electromechanical speakers 204 and the ultrasonic transducers 114 may be perceived by a user 502 of the audible device 102 generally simultaneously.

The processes discussed in this disclosure may be implemented in hardware, software, or both hardware and software. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A tablet computer comprising:
   a display for outputting video content;
   a first ultrasonic transducer configured to emit ultrasonic signals in a first direction;
   a second ultrasonic transducer configured to emit ultrasonic signals in a second direction;
   one or more non-transitory computer-readable storage media storing computer-executable instructions; and
   one or more hardware processors configured to execute the computer-executable instructions to:
   access audio content for output by the tablet computer;
   cause the first ultrasonic transducer to emit a first ultrasonic pulse in the first direction;
   receive, using one or more of the first ultrasonic transducer, the second ultrasonic transducer, or a receiver, a first reflected ultrasonic pulse from the first direction, the first reflected ultrasonic pulse being reflected from a first object;
   determine a first distance to the first object based at least partially on a time that the first ultrasonic pulse was emitted and a time that the first reflected ultrasonic pulse was received;

determine a first intensity based at least partially on the first distance, wherein the first intensity is configured to enable audio signals emitted toward the first object and reflected toward the tablet computer to provide audible sound having a volume greater than or equal to a threshold volume at a location of the tablet computer;

cause the second ultrasonic transducer to emit a second ultrasonic pulse in the second direction;

receive, using the one or more of the first ultrasonic transducer, the second ultrasonic transducer, or the receiver, a second reflected ultrasonic pulse from the second direction, the second reflected ultrasonic pulse being reflected from a second object;

determine a second distance to the second object based at least partially on a time that the second ultrasonic pulse was emitted and a time that the second reflected ultrasonic pulse was received;

determine a second intensity based at least partially on the second distance, wherein the second intensity is configured to enable audio signals emitted toward the second object and reflected toward the tablet computer to provide audible sound having a volume greater than or equal to the threshold volume at the location of the tablet computer;

generate a first audio signal using the audio content and the first intensity, wherein the first audio signal comprises audible frequencies ranging from 20 hertz to 20,000 hertz;

generate a second audio signal using the audio content and the second intensity, wherein the second audio signal comprises audible frequencies ranging from 20 hertz to 20,000 hertz;

cause the first ultrasonic transducer to emit, in the first direction, a first ultrasonic carrier comprising the first audio signal, wherein the first ultrasonic carrier is demodulated by one or more of passage across the first distance or interaction with the first object, and wherein the first audio signal is reflected by the first object toward the tablet computer; and cause the second ultrasonic transducer to emit, in the second direction, a second ultrasonic carrier comprising the second audio signal, wherein the second ultrasonic carrier is demodulated by one or more of passage across the second distance or interaction with the second object, and wherein the second audio signal is reflected by the second object toward the tablet computer.

2. The tablet computer of claim 1, further comprising:
a motion sensor configured to detect movement of the tablet computer; and
the one or more non-transitory computer-readable storage media further storing computer-executable instructions to cause the one or more hardware processors to:
determine the movement of the tablet computer using the motion sensor;
determine the movement of the tablet computer exceeds a threshold quantity of movement;
cause the first ultrasonic transducer to emit a third ultrasonic pulse in the first direction;
receive, using the one or more of the first ultrasonic transducer, the second ultrasonic transducer, or the receiver, a third reflected ultrasonic pulse from the first direction, the third reflected ultrasonic pulse being reflected by one or more of the first object, the second object, or a third object;

determine a third distance to the one or more of the first object, the second object or the third object based at least partially on a time that the third ultrasonic pulse was emitted and a time that the third reflected ultrasonic pulse was received;

determine a third intensity based at least partially on the third distance, wherein the third intensity is configured to enable audio signals emitted toward the one or more of the first object, the second object, or the third object and reflected toward the tablet computer to provide audible sound having a volume greater than or equal to the threshold volume at the location of the tablet computer;

cause the first ultrasonic transducer to emit, in the first direction, a third ultrasonic carrier comprising the first audio signal, wherein the first audio signal is emitted at the third intensity;

cause the second ultrasonic transducer to emit a fourth ultrasonic pulse in the second direction;

receive, using the one or more of the first ultrasonic transducer, the second ultrasonic transducer, or the receiver, a fourth reflected ultrasonic pulse from the second direction, the fourth reflected ultrasonic pulse being reflected by one or more of the first object, the second object, or a fourth object;

determine a fourth distance to the one or more of the first object, the second object, or the fourth object based at least partially on a time that the fourth ultrasonic pulse was emitted and a time that the fourth reflected ultrasonic pulse was received;

determine a fourth intensity based at least partially on the fourth distance, wherein the fourth intensity is configured to enable audio signals emitted toward the one or more of the first object, the second object, or the fourth object and reflected toward the tablet computer to provide audible sound having a volume greater than or equal to the threshold volume at the location of the tablet computer; and cause the second ultrasonic transducer to emit, in the second direction, a fourth ultrasonic carrier comprising the second audio signal, wherein the second audio signal is emitted at the fourth intensity.

3. The tablet computer of claim 1, the one or more non-transitory computer-readable storage media further storing computer-executable instructions to cause the one or more hardware processors to:
determine the first distance to be greater that the second distance;
determine a first delay time corresponding to emission of the second ultrasonic carrier, wherein the first delay time is based at least partially on a difference between the first distance and the second distance;
determine a second delay time corresponding to providing of the video content, wherein the second delay time is based at least partially on the second distance, and wherein the second delay time is less than the first delay time; and
cause providing of the first ultrasonic carrier prior to providing of the second ultrasonic carrier and prior to providing of the video content;
cause providing of the second ultrasonic carrier subsequent to a lapse of the first delay time, wherein the second ultrasonic carrier is provided subsequent to providing the first ultrasonic carrier and prior to providing the video content; and
cause the display to output the video content subsequent to a lapse of the second delay time, wherein the video content is displayed subsequent to providing the first ultrasonic carrier and subsequent to providing the second ultrasonic carrier, wherein the first audio signal and the second audio signal reach a location of the tablet computer within a threshold length of time of the lapse of the second delay time to synchronize the first audio signal, the second audio signal, and the video content at a location associated with the tablet computer.

4. The tablet computer of claim 1, further comprising:
one or more electromechanical speakers configured to emit audio sound; and
the one or more non-transitory computer-readable storage media further storing computer-executable instructions to cause the one or more hardware processors to:
    generate a third audio signal for emission by the one or more electromechanical speakers; and
    cause at least a subset of the one or more electromechanical speakers to emit the third audio signal as an additional audible sound, wherein at least a portion of the additional audible sound comprises a frequency less than or equal to 1,000 hertz.

5. A method comprising:
emitting from an audio device, at a first time, a first ultrasonic signal in a first direction, wherein a first object reflects the first ultrasonic signal, forming a first reflected ultrasonic signal;
receiving by the audio device, at a second time, the first reflected ultrasonic signal;
determining a first distance between the audio device and the first object based at least in part on the first time and the second time;
accessing a threshold volume;
determining a first intensity of a first audio signal based at least partially on the first distance, wherein the first intensity is configured to enable audio signals emitted toward and reflected by the first object to provide audible sound having a volume greater than or equal to the threshold volume at a location of the audio device;
generating, based at least in part on the first intensity, a first ultrasonic carrier modulated with the first audio signal; and
emitting the first ultrasonic carrier comprising the first audio signal toward the first object, wherein the first audio signal is emitted at the first intensity, and wherein one or more of passage across the first distance or interaction between the first object and the first ultrasonic carrier demodulates the first ultrasonic carrier and reflects at least a portion of the first audio signal toward the audio device.

6. The method of claim 5, further comprising:
generating image data corresponding to the first object using an image sensor; and
determining a location of the first object relative to the image sensor using the image data;
wherein the first distance is further determined based at least partially on the location of the first object.

7. The method of claim 5, further comprising:
emitting by the audio device, at one or more of the first time or a third time, a second ultrasonic signal in a second direction toward a second object using an ultrasonic emitter, wherein the second object reflects a portion of the second ultrasonic signal, forming a second reflected ultrasonic signal;
receiving by the audio device, at a fourth time, the second reflected ultrasonic signal using an ultrasonic receiver;
determining a second distance between the audio device and the second object based at least partially on the fourth time and the one or more of the first time or the third time;
determining a second intensity of a second audio signal based at least partially on the second distance, wherein the second intensity is configured to enable audio signals emitted toward the second object and reflected toward the audio device to provide audible sound having a volume greater than or equal to the threshold volume at the location of the audio device;
generating a second ultrasonic carrier modulated with the second audio signal; and
emitting the second ultrasonic carrier comprising the second audio signal toward the second object, wherein the second audio signal is emitted at the second intensity, and wherein one or more of passage across the second distance or interaction between the second object and the second ultrasonic carrier demodulates the second ultrasonic carrier and reflects at least a portion of the second audio signal toward the audio device.

8. The method of claim 5, further comprising:
receiving the at least a portion of the first audio signal reflected by the first object; and
determining one or more characteristics of the at least a portion of the first audio signal;
wherein the first distance is further determined based at least partially on the one or more characteristics.

9. The method of claim 5, further comprising:
receiving the at least a portion of the first audio signal reflected by the first object;
determining, based on one or more characteristics of the at least a portion of the first audio signal, one or more of: movement of the audio device, a position of the first object relative to the audio device, or a position of one or more additional objects relative to the audio device;
determining a second distance between the audio device and one or more of the first object or the one or more additional objects;
determining a second intensity based at least partially on the second distance; and
emitting the first ultrasonic carrier comprising the first audio signal at the second intensity.

10. The method of claim 5, further comprising:
determining one or more of movement of the audio device, a position of the first object relative to the audio device, or a position of one or more additional objects relative to the audio device:
determining a second distance between the audio device and one or more of the first object or the one or more additional objects;
determining a second intensity of a second audio signal based at least partially on the second distance;
generating the second audio signal comprising the second intensity; and
emitting a second ultrasonic carrier comprising the second audio signal toward the one or more of the first object or the one or more additional objects, wherein the second audio signal is emitted at the second intensity.

11. The method of claim 5, further comprising:
determining a delay time associated with emission of the first ultrasonic carrier, wherein the delay time is based at least partially on a travel time associated with the first distance between the audio device and the first object;
determining a lapse of the delay time; and providing one or more of a video signal, an additional audio signal, or an additional ultrasonic carrier to an output device subsequent to the lapse of the delay time to synchronize receipt, at the location of the audio device, of the at least a portion of the first audio signal reflected by the first object and the one or more of the video signal, the additional audio signal, or an audio signal associated with the additional ultrasonic carrier.

12. The method of claim 5, further comprising
emitting, at one or more of the first time or a third time, a second ultrasonic signal in a second direction to determine a second distance between the audio device and a second object;
determining a lack of a second reflected ultrasonic pulse from the second direction; and
deactivating one or more ultrasonic emitters associated with emitting a second ultrasonic carrier in the second direction.

13. A system comprising:
a plurality of ultrasonic transducers;
one or more non-transitory computer-readable storage media storing computer-executable instructions; and
one or more hardware processors configured to execute the computer-executable instructions to:
 cause at least a subset of the plurality of ultrasonic transducers to emit one or more ultrasonic pulses including at least a first ultrasonic pulse in a first direction and a second ultrasonic pulse in a second direction;
 receive, using one or more of an ultrasonic receiver or at least one of the plurality of ultrasonic transducers, at least a portion of the one or more ultrasonic pulses reflected by one or more objects, wherein the first ultrasonic pulse is reflected by a first object and the second ultrasonic pulse is reflected by a second object;
 determine a first distance associated with the first object based at least in part on a time that the first ultrasonic pulse was emitted and a time that the first ultrasonic pulse was received;
 determine a second distance associated with the second object based at least in part on a time that the second ultrasonic pulse was emitted and a time that the second ultrasonic pulse was received;
 the threshold volume;
 determine a first intensity of a first audio signal based at least partially on the first distance, wherein the first intensity is configured to enable audio signals emitted toward the first object and reflected toward a location of the at least a subset of the plurality of ultrasonic transducers to provide audible sound having a first volume greater than or equal to the threshold volume at the location;
 determine a second intensity of a second audio signal based at least partially on the second distance, wherein the second intensity is configured to enable audio signals emitted toward the second object and reflected toward the location to provide audible sound having a second volume greater than or equal to the threshold volume at the location;
 generate the first audio signal comprising the first intensity;
 generate the second audio signal comprising the second intensity; and
cause one or more of the at least a subset of the plurality of ultrasonic transducers to emit at least one ultrasonic carrier comprising the first audio signal and the second audio signal, wherein one or more of passage across the first distance or interaction between the at least one ultrasonic carrier and the first object demodulates the at least one ultrasonic carrier and reflects at least a portion of the first audio signal toward the location and one or more of passage across the second distance or interaction between the at least one ultrasonic carrier and the second object demodulates the at least one ultrasonic carrier and reflects at least a portion of the second audio signal toward the location.

14. The system of claim 13, the one or more non-transitory computer-readable storage media further comprising computer-executable instructions to cause the one or more hardware processors to:
 determine a portion of the at least a subset of the plurality of ultrasonic transducers associated with the at least a portion of the one or more ultrasonic pulses reflected by the one or more objects;
 determine correspondence between the at least a subset of the plurality of ultrasonic transducers that emitted the one or more ultrasonic pulses and the portion of the at least a subset of the plurality of ultrasonic transducers; and
 based at least partially on the correspondence, deactivate one or more of the at least a subset of the plurality of ultrasonic transducers.

15. The system of claim 13, wherein the plurality of ultrasonic transducers comprises:
 at least one first ultrasonic transducer positioned on a first side of an audio device and configured to emit ultrasonic signals in the first direction; and
 at least one second ultrasonic transducer positioned on a second side of the audio device and configured to emit ultrasonic signals in the second direction.

16. The system of claim 13, further comprising:
a speaker for emitting audio content; and
the one or more non-transitory computer-readable storage media further comprising computer-executable instructions to cause the one or more hardware processors to:
 determine a first time that at least one ultrasonic pulse was emitted;
 determine a second time that the at least one ultrasonic pulse was received;
 determine a delay time based at least partially on one or more of the first time or the second time; and
 cause the speaker to emit the audio content subsequent to emission of the at least one ultrasonic carrier, at a time based at least partially on the delay time.

17. The system of claim 13, further comprising:
a display for displaying video content; and
the one or more non-transitory computer-readable storage media further comprising computer-executable instructions to cause the one or more hardware processors to:
 determine a first time that at least one ultrasonic pulse was emitted;
 determine a second time that the at least one ultrasonic pulse was received;
 determine a delay time based at least partially on one or more of the first time or the second time; and
 cause the display to output the video content subsequent to emission of the at least one ultrasonic carrier, at a time based at least partially on the delay time.

18. The system of claim 13, further comprising:
a speaker; and
the one or more non-transitory computer-readable storage media further comprising computer-executable instructions to cause the one or more hardware processors to:
access audio content;
generate a third audio signal corresponding to the audio content; and
cause the speaker to emit the third audio signal as audible sound, wherein at least a portion of the audible sound comprises a frequency less than or equal to 1,000 hertz.

19. The system of claim 13, the one or more non-transitory computer-readable storage media further comprising computer-executable instructions to cause the one or more hardware processors to:
determine movement of one or more of the plurality of ultrasonic transducers;
cause one or more of the plurality of ultrasonic transducers to emit at least one additional ultrasonic pulse;
receive at least a portion of the at least one additional ultrasonic pulse reflected by one or more objects;
determine an additional distance associated with the at least a portion of the at least one additional ultrasonic pulse;
determine an additional characteristic of the first audio signal based at least partially on the additional distance; and
modify the first audio signal based at least partially on the additional characteristic.

20. The system of claim 13, the one or more non-transitory computer-readable storage media further comprising computer-executable instructions to cause the one or more hardware processors to:
determine an additional characteristic of the first audio signal based at least partially on the location; and
modify the first audio signal based at least partially on the additional characteristic.

* * * * *

UNITED STATES PATENT AND TRADEMARK OFFICE
CERTIFICATE OF CORRECTION

PATENT NO. : 9,762,195 B1
APPLICATION NO. : 14/577633
DATED : September 12, 2017
INVENTOR(S) : David Zhi-Jun Tao Page 1 of 1

It is certified that error appears in the above-identified patent and that said Letters Patent is hereby corrected as shown below:

In the Claims

Column 29; Line 45:
the threshold volume; -- should read -- access a threshold volume;

Signed and Sealed this
Seventh Day of November, 2017

Joseph Matal
*Performing the Functions and Duties of the*
*Under Secretary of Commerce for Intellectual Property and*
*Director of the United States Patent and Trademark Office*